United States Patent
Kimura et al.

(10) Patent No.: US 8,248,707 B2
(45) Date of Patent: Aug. 21, 2012

(54) ZOOM LENS AND IMAGE PICKUP APPARATUS HAVING THE SAME

(75) Inventors: Tomonori Kimura, Utsunomiya (JP); Akihisa Horiuchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 69 days.

(21) Appl. No.: 13/030,528

(22) Filed: Feb. 18, 2011

(65) Prior Publication Data
US 2011/0211265 A1 Sep. 1, 2011

(30) Foreign Application Priority Data
Feb. 26, 2010 (JP) .................................. 2010-041945

(51) Int. Cl.
*G02B 15/14* (2006.01)
(52) U.S. Cl. ........................................ 359/687; 359/683
(58) Field of Classification Search .................. 359/676, 359/683, 687
See application file for complete search history.

(56) References Cited

U.S. PATENT DOCUMENTS

| 4,110,006 | A | * | 8/1978 | Ikemori | ........................ 359/684 |
| 6,084,722 | A | | 7/2000 | Horiuchi | |
| 2008/0310033 | A1 | | 12/2008 | Miyazawa | |

* cited by examiner

*Primary Examiner* — Scott J Sugarman
(74) *Attorney, Agent, or Firm* — Rossi, Kimms & McDowell LLP

(57) ABSTRACT

A zoom lens includes positive, negative, positive, and positive lens units, and the second lens unit includes negative, negative, negative and positive lenses. The first and third lens units are fixed and the second and fourth lens units are moved in zooming. $0.01<|f2/\sqrt{(fw*ft)}|<0.35$ and $0.070<D2/TL<0.105$ are satisfied. fw and ft are focal lengths of an overall system at wide angle and telephoto ends, f2 is a focal length of the second lens unit, TL is a distance on an optical axis from a lens surface closest to an object plane to an image plane when a distance from a lens surface closest to the image plane to the image plane is aerially converted, and D2 is a distance on the optical axis from a lens surface closest to the object plane in the second lens unit to the lens surface closest to the image plane in the second lens unit.

10 Claims, 11 Drawing Sheets

ZOOM LENS AND IMAGE PICKUP APPARATUS HAVING THE SAME

BACKGROUND OF THE INVENTION

1. Field of the Invention

The present invention relates to a zoom lens, which is suitable for an image pickup lens in an image pickup apparatus, such as a video camera, a surveillance camera, a digital still camera, a broadcasting camera, and a film-based camera.

2. Description of the Related Art

An image pickup optical system used for an image pickup apparatus using a solid-state image sensing device, such as a video camera, a surveillance camera, and a digital still camera, is required for a small zoom lens having a wide angle of view, a high zoom ratio, and a high optical performance. One known zoom lens that satisfies these requirements is a four-unit zoom lens that includes, in order from the object side to the image side, a first lens unit having a positive refractive power, a second lens unit having a negative refractive power, a third lens unit having a positive refractive power, and a fourth lens unit having a positive refractive power. In this type, a conventional, so-called rear focus type four-unit zoom lens is configured to vary a magnification by moving the second lens unit, to correct an image fluctuation associated with the magnification variation using the fourth lens unit, and to provide focusing (U.S. Pat. No. 6,084,722 and U.S. Patent Application, Publication No. 2008/0310033).

In general, in order to makes the zoom lens smaller and the zooming ratio higher, a larger refractive power of each lens unit is effective. However, simply making larger the refractive power of each lens unit would enlarge the aberrational fluctuations associated with zooming and cause difficulties to obtain good optical performance over the entire zoom range.

In order for the above rear focus type four-unit zoom lens to have a small overall system, a wide angle of view, and a high zoom ratio, it is important to properly set a negative refractive power and a lens configuration of the magnification-varying second lens unit. When the lens shape, the configuration, the refractive power, etc. of each lens in the second lens unit are improper, it becomes difficult to provide a small overall system with a wide angle of view and a high zoom ratio. In addition, it becomes difficult to obtain a high optical performance since fluctuations of a variety of aberrations associated with zooming increase. It is also important to properly set the refractive power of each lens unit for the wide angle of view in the small overall system while the predetermined zoom ratio is maintained.

SUMMARY OF THE INVENTION

The present invention provides a zoom lens and an image pickup apparatus having the same, which has a wide angle of view, a high zoom ratio, and a high optical performance throughout the entire zoom range.

A zoom lens according to the present invention includes, in order from an object side to an image side, a first lens unit having a positive refractive power, a second lens unit having a negative refractive power, a third lens unit having a positive refractive power, a fourth lens unit having a positive refractive power. The first and third lens units are fixed and the second and fourth lens units are moved in zooming. The second lens unit includes, in order from the object side to the image side, a sub-first lens having a negative refractive power, a sub-second lens having a negative refractive power, a sub-third lens having a negative refractive power, and a sub-fourth lens having a positive refractive power. The following conditional expressions are satisfied $0.01 < |f2/\sqrt{(fw*ft)}| < 0.35$ and $0.070 < D2/TL < 0.105$, where fw is a focal length of an overall system at a wide angle end, ft is a focal length of the overall system at a telephoto end, f2 is a focal length of the second lens unit, TL is a distance on an optical axis from a lens surface closest to an object plane to an image plane when a distance from a lens surface closest to the image plane to the image plane is aerially converted, and D2 is a distance on the optical axis from a lens surface closest to the object plane in the second lens unit to the lens surface closest to the image plane in the second lens unit.

Further features of the present invention will become apparent from the following description of exemplary embodiments with reference to the attached drawings.

DESCRIPTION OF THE EMBODIMENTS

A description will now be given of a zoom lens and an image pickup apparatus having the same according to one embodiment of the present invention. The zoom lens of this embodiment includes, in order from an object side to an image side, a first lens unit having a positive refractive power, a second lens unit having a negative refractive power, a third lens unit having a positive refractive power, and a fourth lens unit having a positive refractive power. In zooming, the second lens unit and the fourth lens unit are moved whereas the first lens unit and the third lens unit are fixed. In focusing, the fourth lens unit is moved. There may be arranged a lens unit having a refractive power, such as a converter lens, on at least one of the object side of the first lens unit or the image side of the fourth lens unit.

Figure 1:
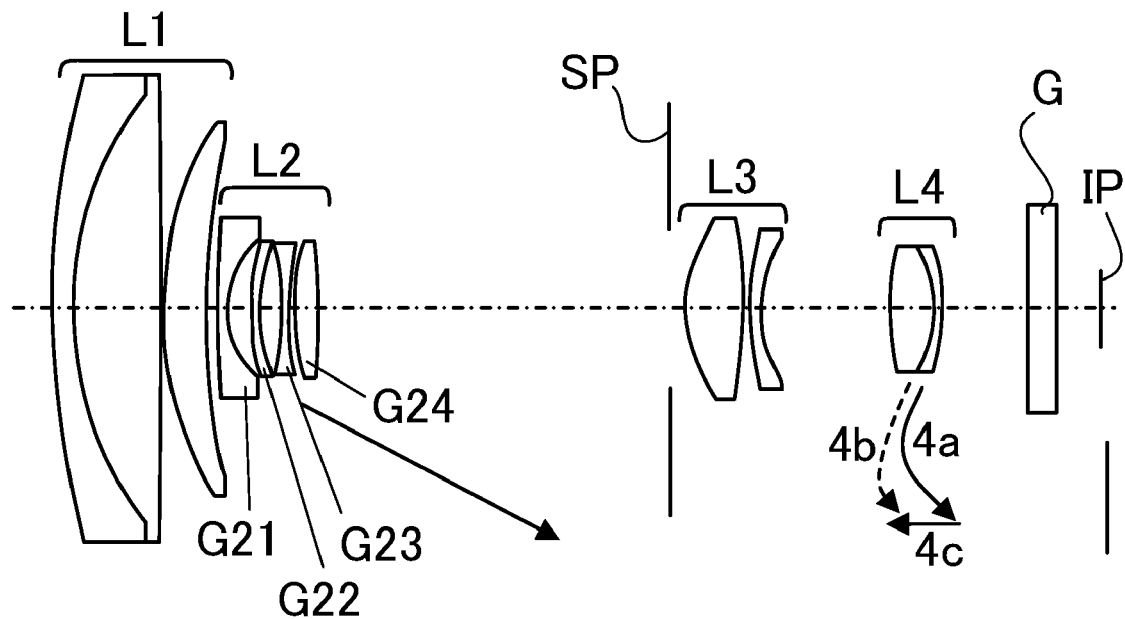
FIG. 1 is a lens sectional view of a zoom lens on a wide angle end according to a first embodiment.
Figure 2A:
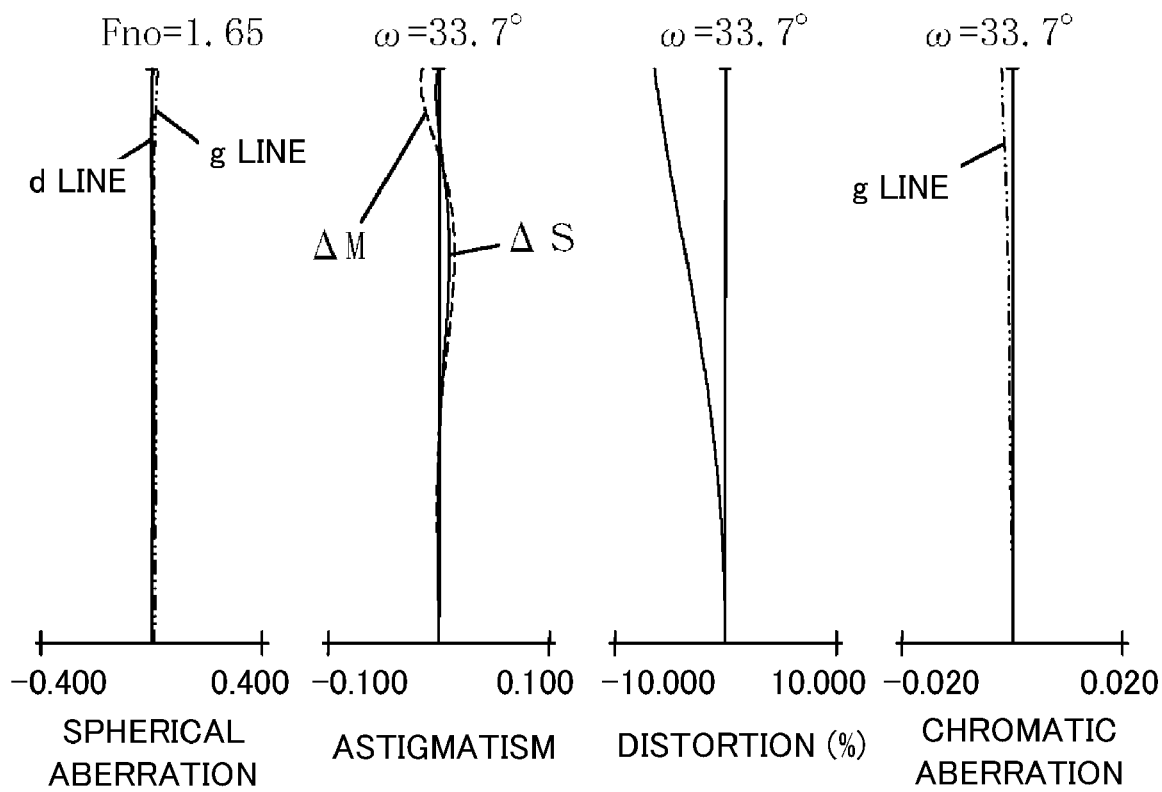
FIGS. 2A, 2B and 2C illustrate a variety of aberrations of the zoom lens on the wide angle end, an intermediate zoom position, and a telephoto end according to the first embodiment.
Figure 2B:
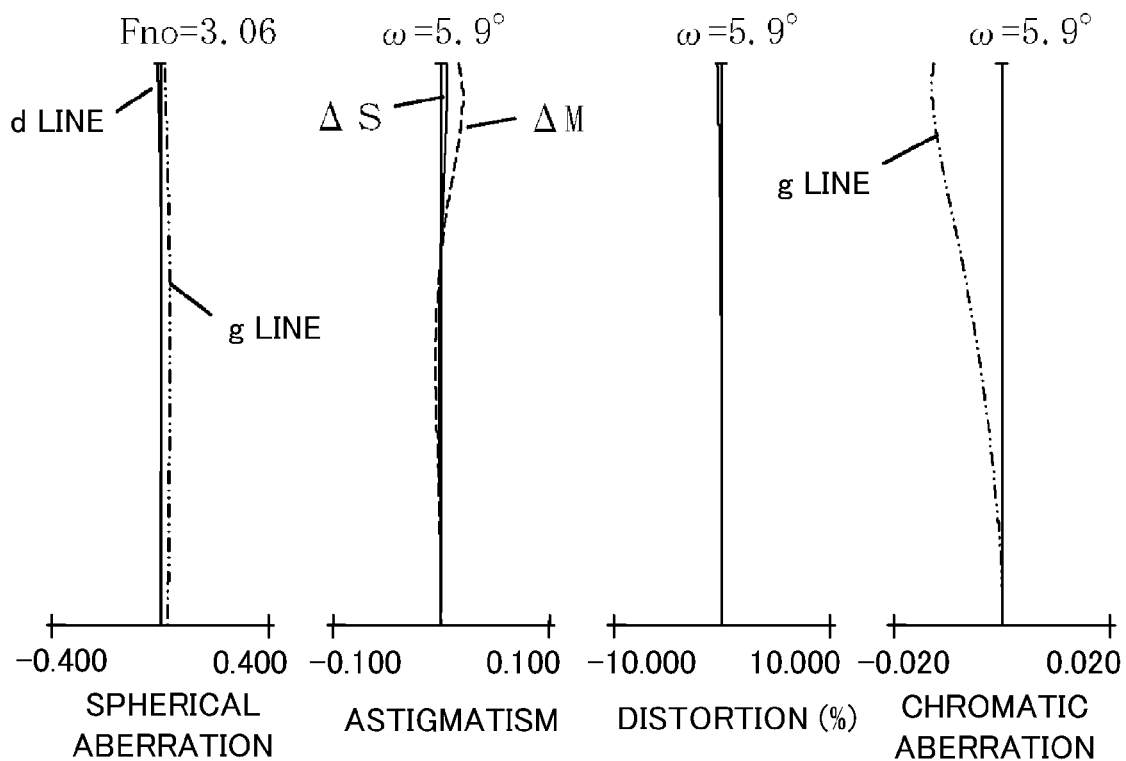
Figure 2C:
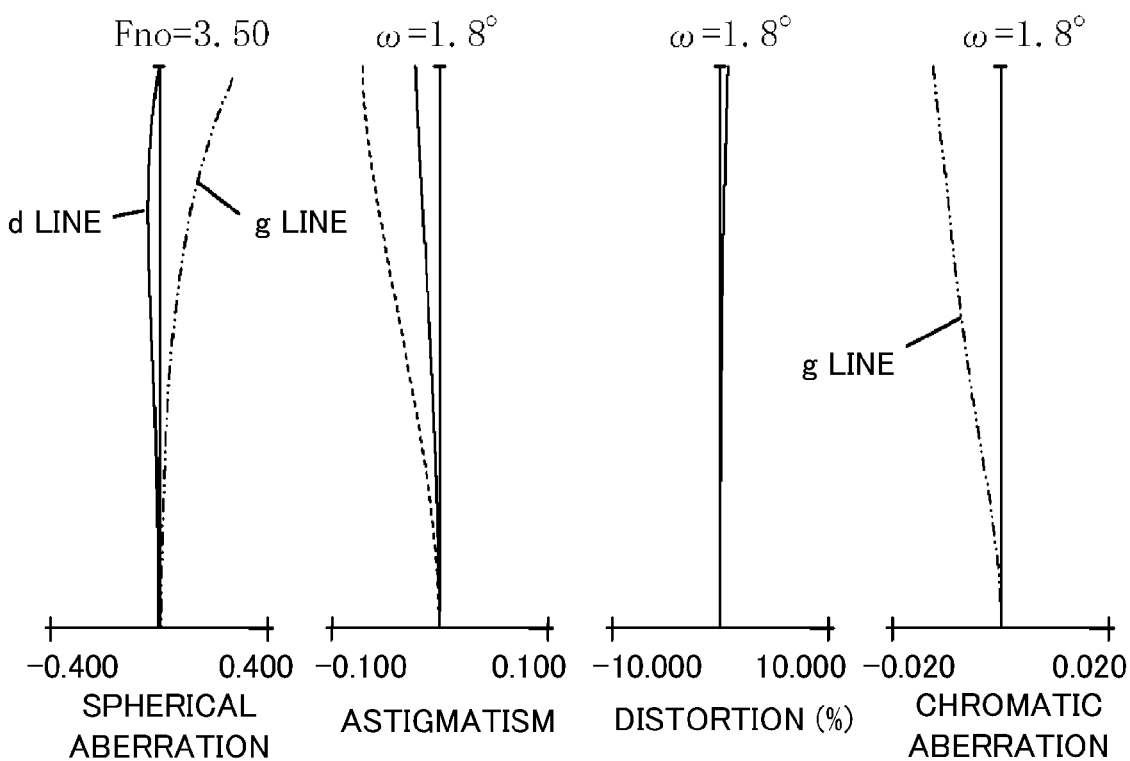
Figure 3:
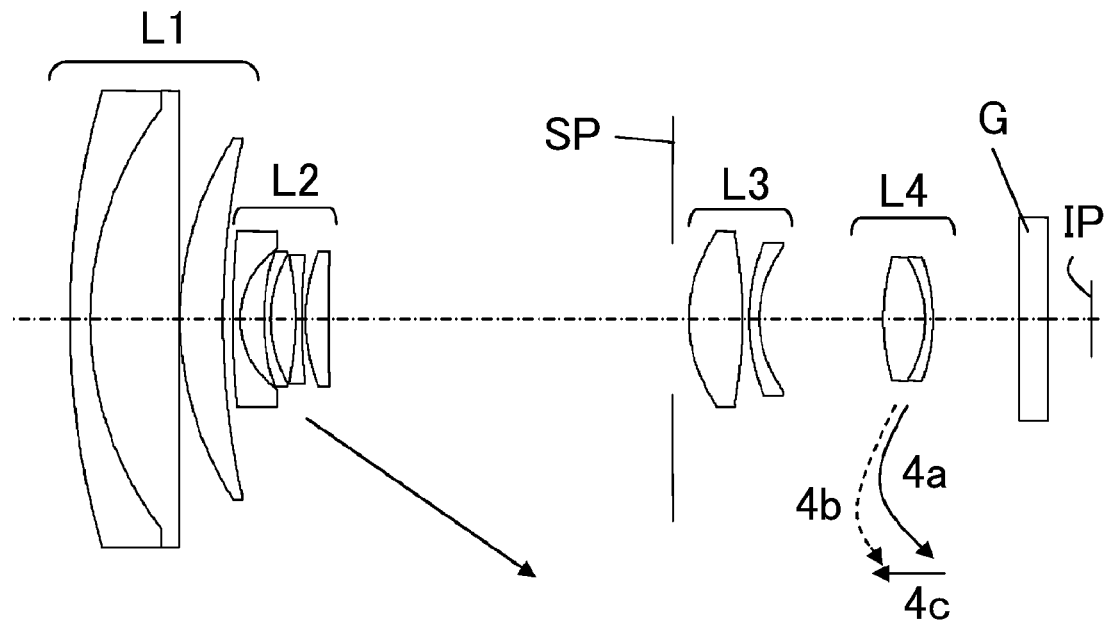
FIG. 3 is a lens sectional view of a zoom lens on a wide angle end according to a second embodiment.
Figure 4A:
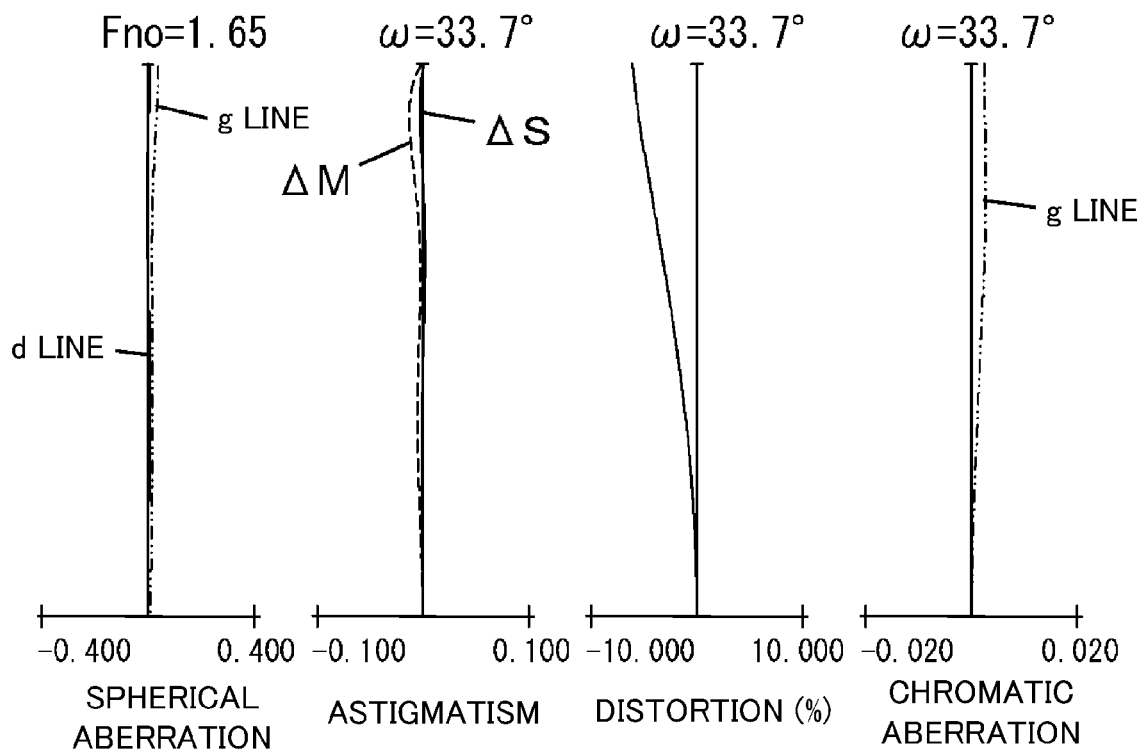
FIGS. 4A, 4B and 4C illustrate a variety of aberrations of the zoom lens on the wide angle end, an intermediate zoom position, and a telephoto end according to the second embodiment.
Figure 4B:
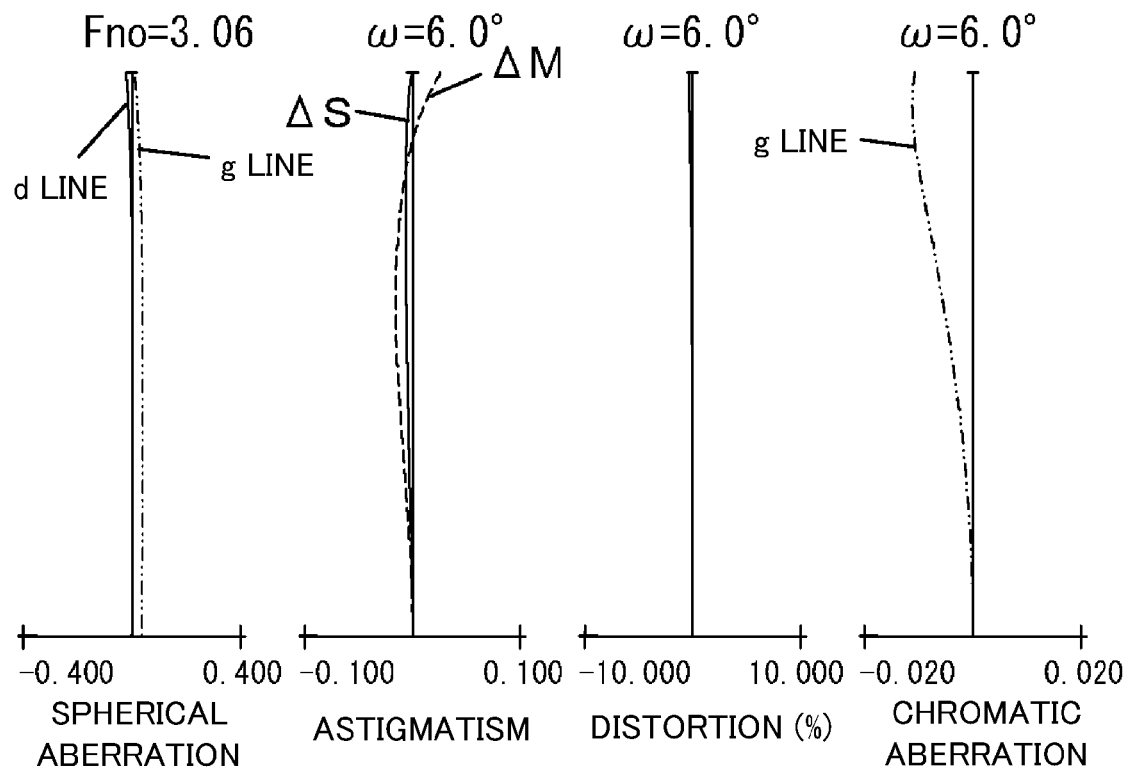
Figure 4C:
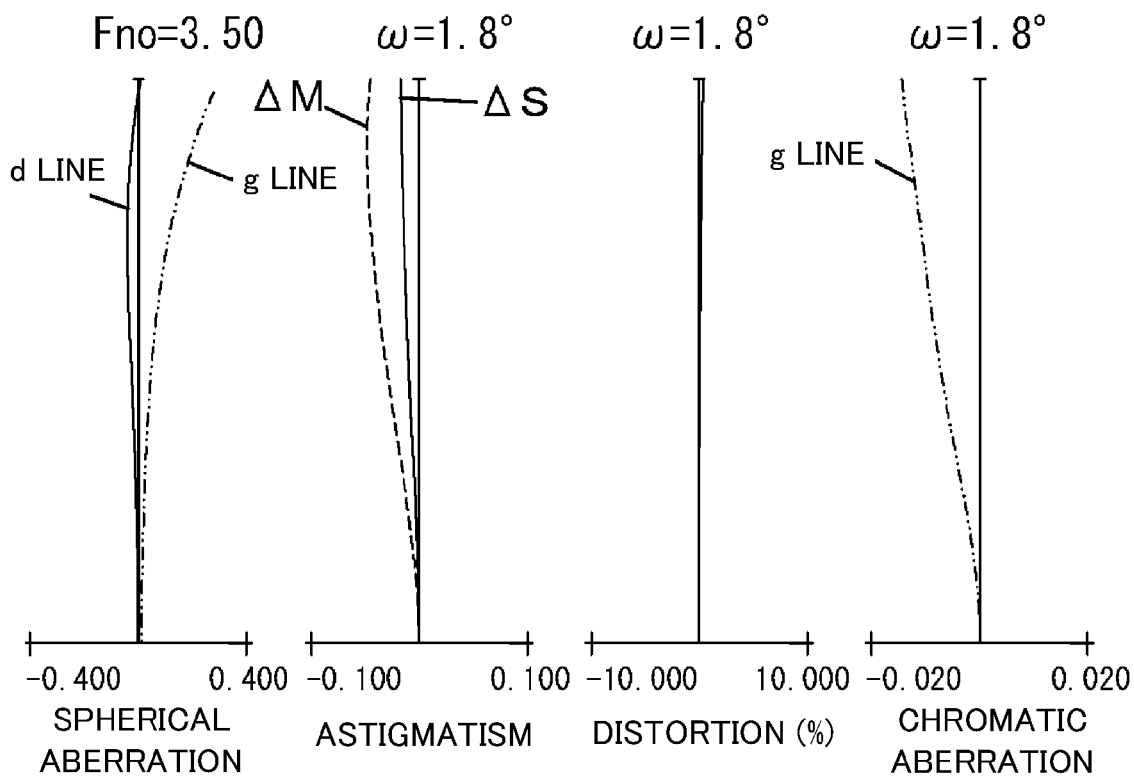

FIG. 1 is a lens sectional view on the wide angle end (short focal length end) of a zoom lens according to the first embodiment of the present invention. FIGS. 2A, 2B, and 2C are aberrational diagrams of the zoom lens according to the first embodiment on the wide angle end, the intermediate zoom position, and the telephoto end (long focal length end). The zoom lens according to the first embodiment has a zoom ratio of 19.79, and an image pickup angle 67.4° on the wide angle end. FIG. 3 is a lens sectional view on a wide angle end of a zoom lens according to a second embodiment of the present invention. FIGS. 4A, 4B, and 4C are aberrational diagrams of the zoom lens according to the second embodiment on the wide angle end, the intermediate zoom position, and the telephoto end. The zoom lens according to the second embodiment has a zoom ratio of 19.73, and an image pickup angle 67.4° on the wide angle end.

Figure 5:
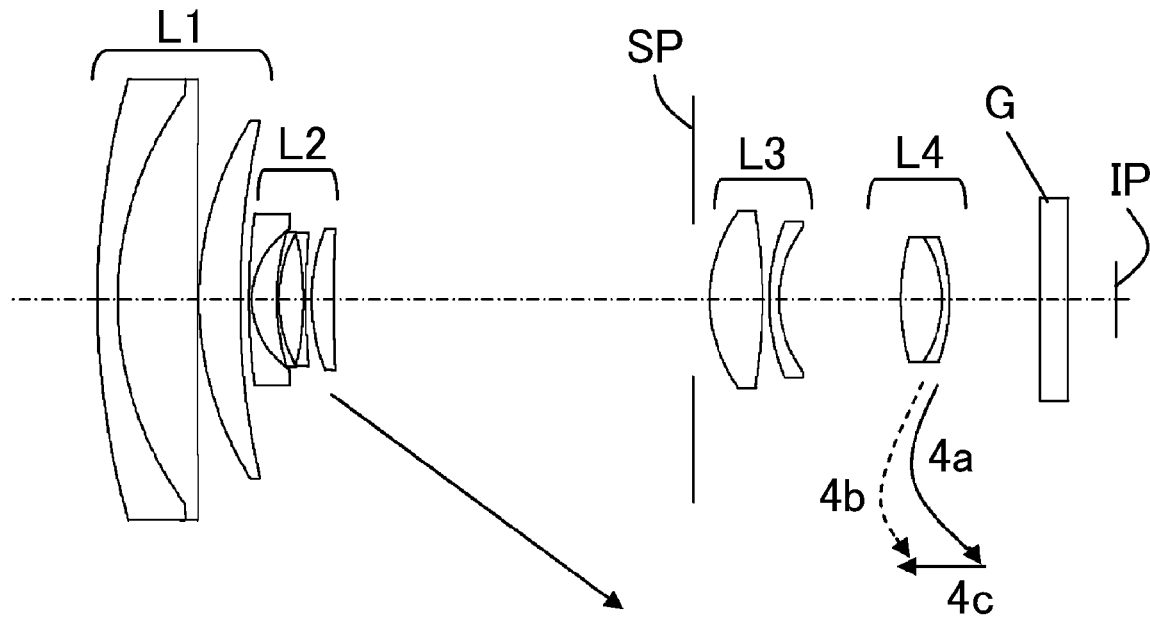
FIG. 5 is a lens sectional view of a zoom lens on a wide angle end according to a third embodiment.
Figure 6A:
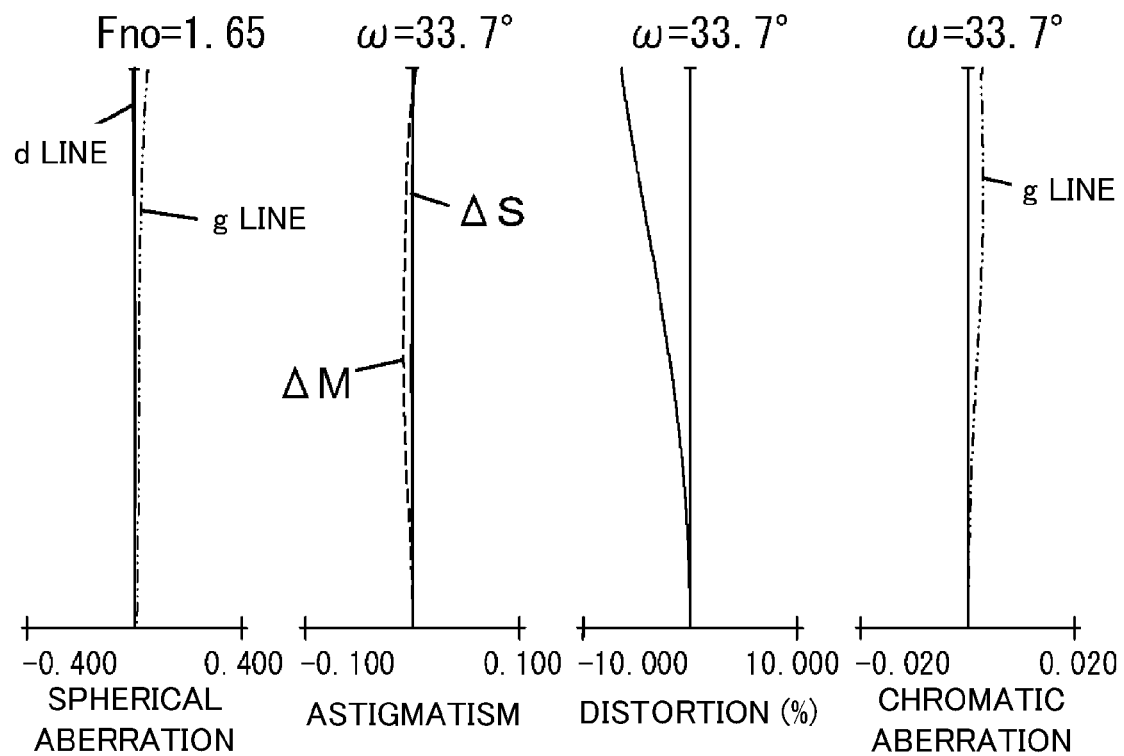
FIGS. 6A, 6B and 6C illustrate a variety of aberrations of the zoom lens on the wide angle end, an intermediate zoom position, and a telephoto end according to the third embodiment.
Figure 6B:
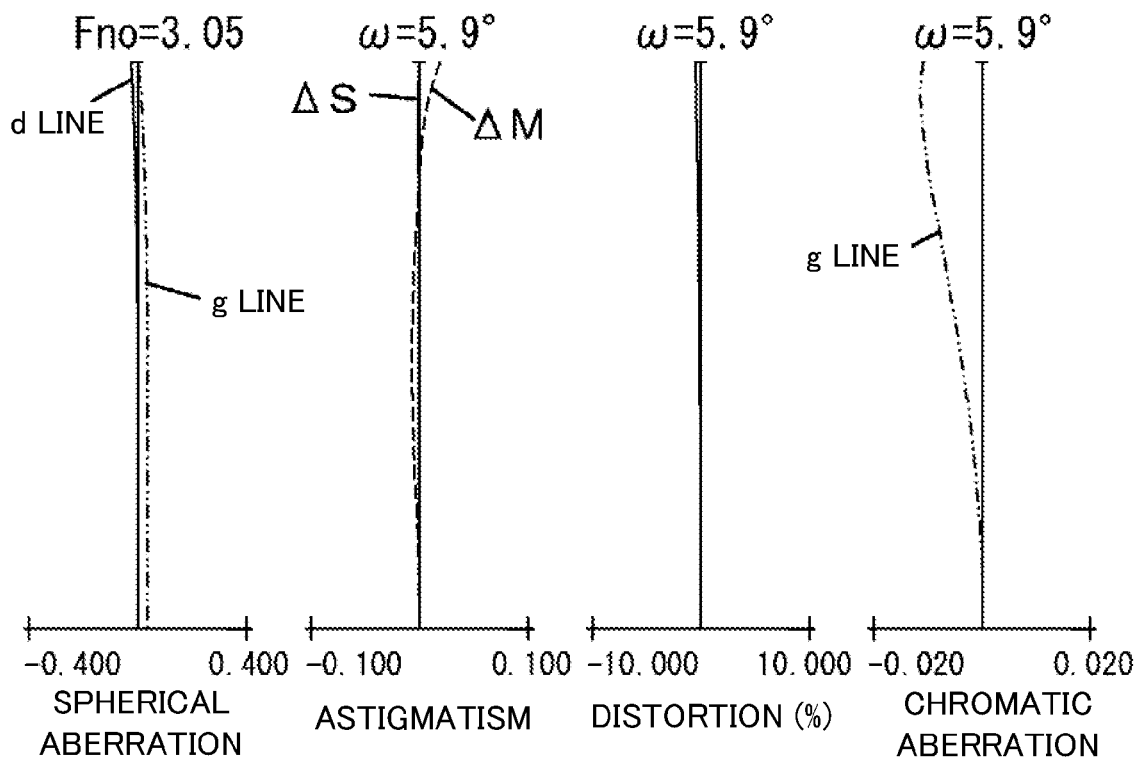
Figure 6C:
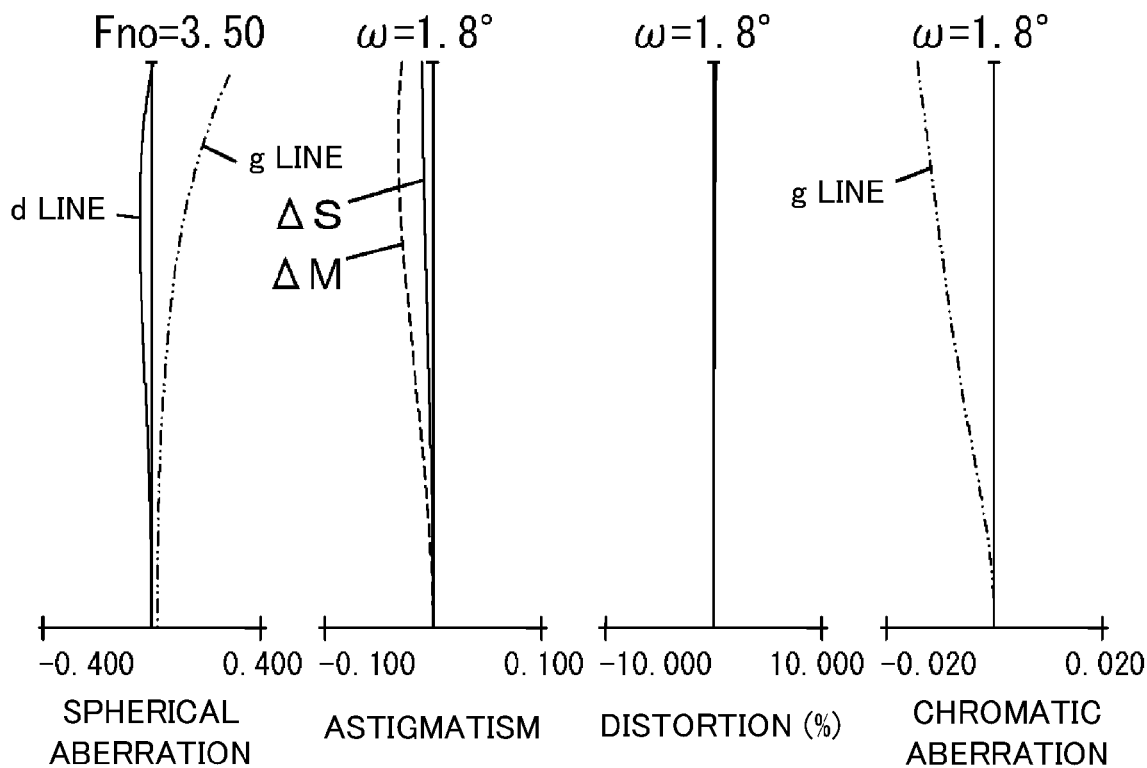
Figure 7:
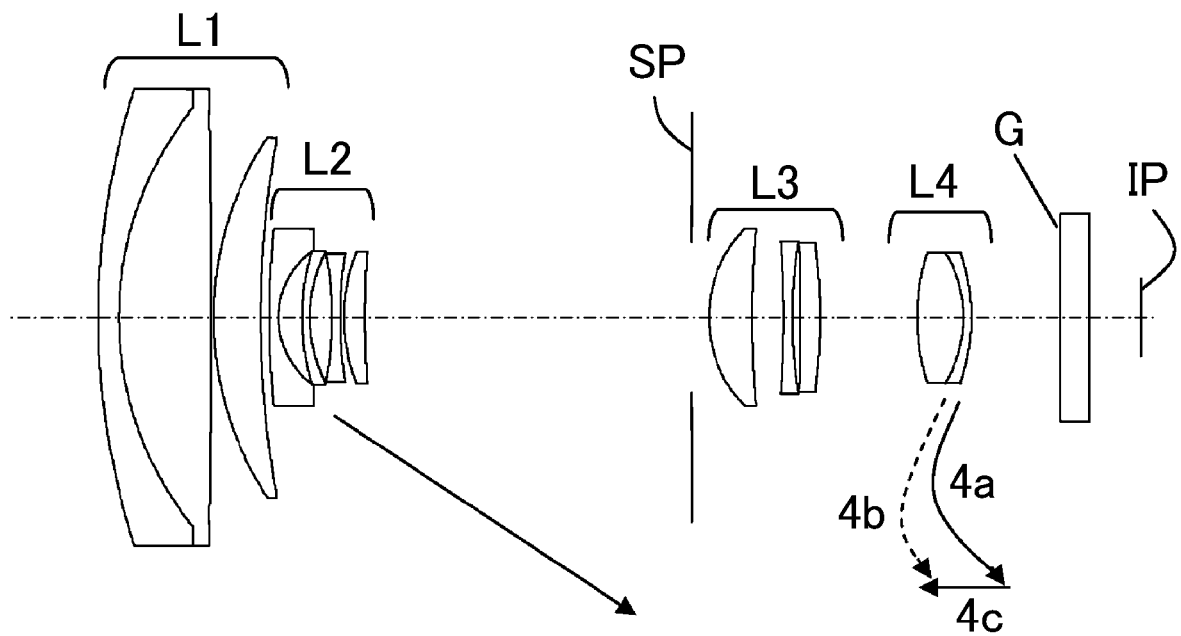
FIG. 7 is a lens sectional view of a zoom lens on a wide angle end according to a fourth embodiment.
Figure 8A:
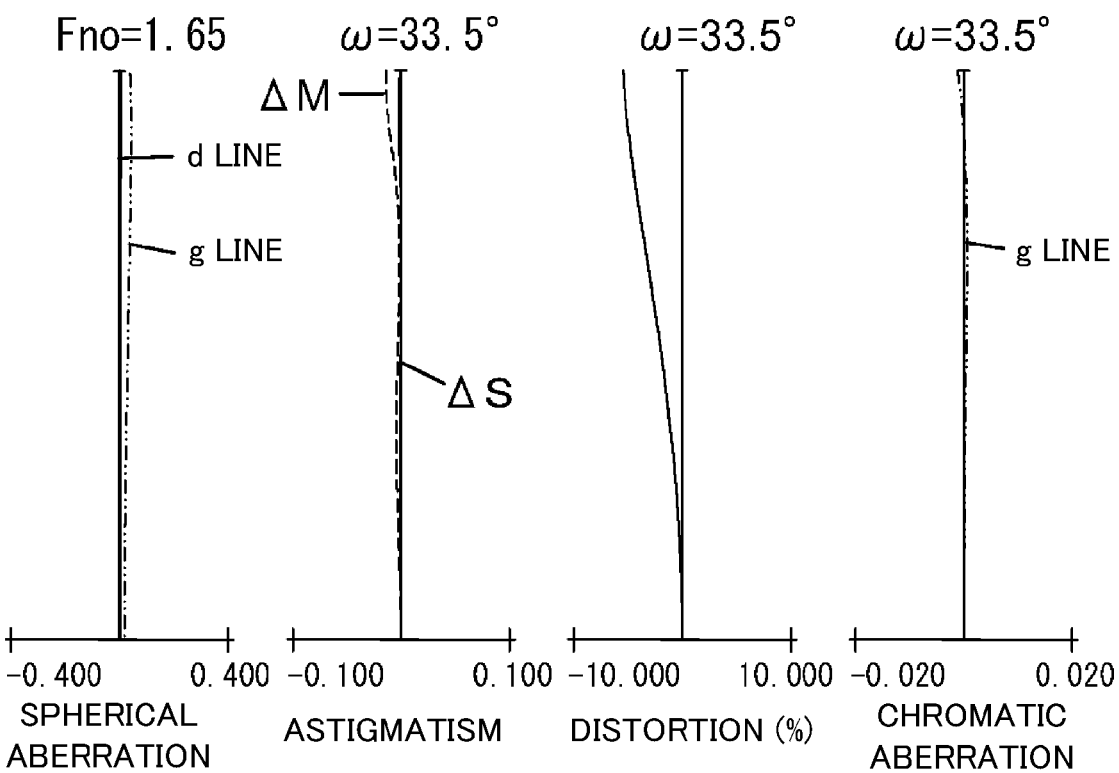
FIGS. 8A, 8B and 8C illustrate a variety of aberrations of the zoom lens on the wide angle end, an intermediate zoom position, and a telephoto end according to the fourth embodiment.
Figure 8B:
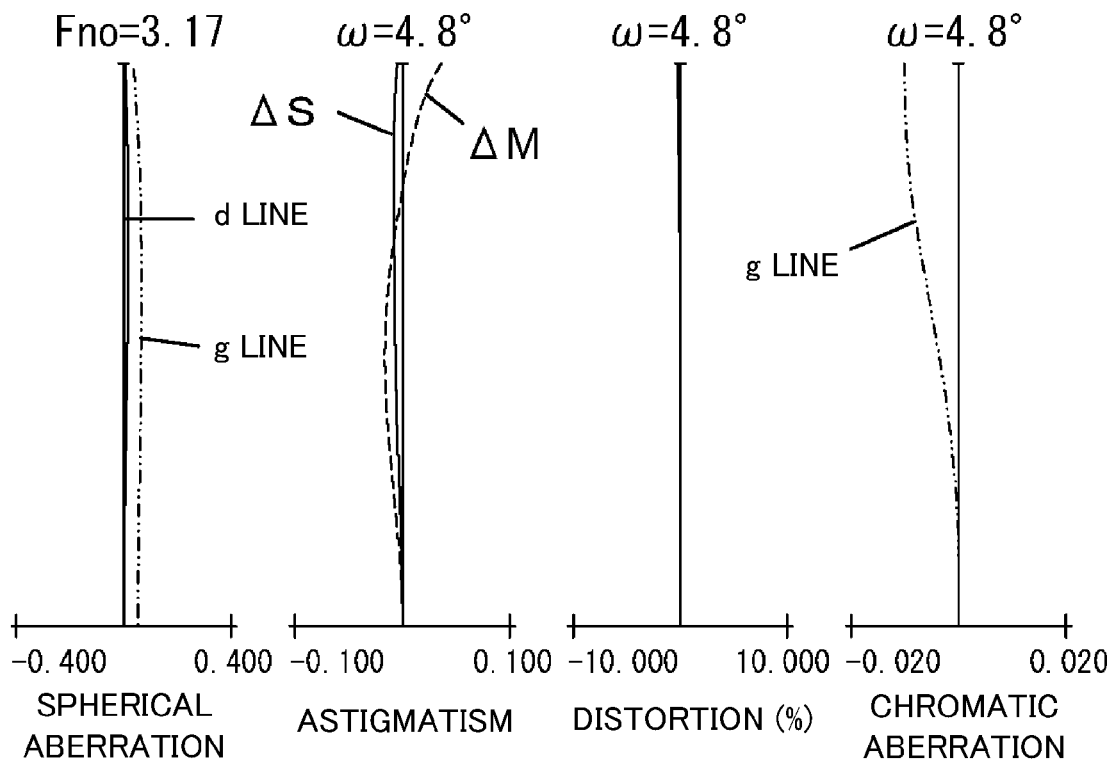
Figure 8C:
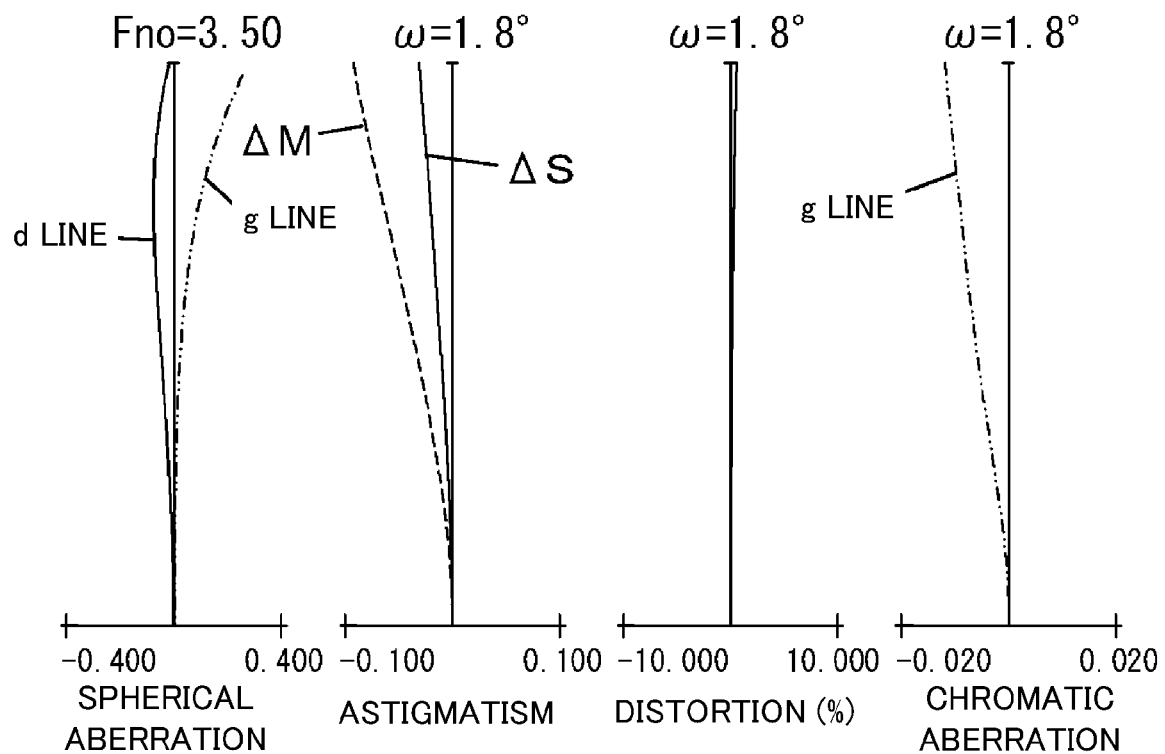

FIG. 5 is a lens sectional view on a wide angle end of a zoom lens according to a third embodiment of the present invention. FIGS. 6A, 6B, and 6C are aberrational diagrams of the zoom lens according to the third embodiment on the wide angle end, the intermediate zoom position, and the telephoto end. The zoom lens according to the third embodiment has a zoom ratio of 19.66, and an image pickup angle 67.4° on the wide angle end. FIG. 7 is a lens sectional view on a wide angle end of a zoom lens according to a fourth embodiment of the present invention. FIGS. 8A, 8B, and 8C are aberrational diagrams of the zoom lens according to the fourth embodiment on the wide angle end, the intermediate zoom position, and the telephoto end. The zoom lens according to the fourth embodiment has a zoom ratio of 19.71, and an image pickup angle 67.0° on the wide angle end.

Figure 9:
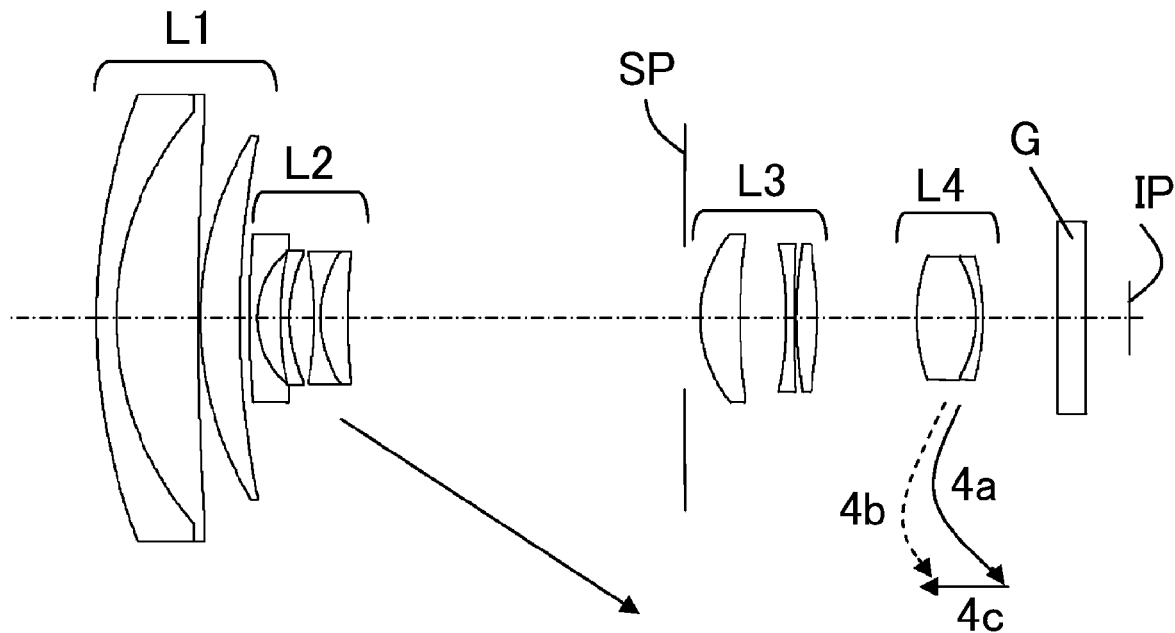
FIG. 9 is a lens sectional view of a zoom lens on a wide angle end according to a fifth embodiment.
Figure 10A:
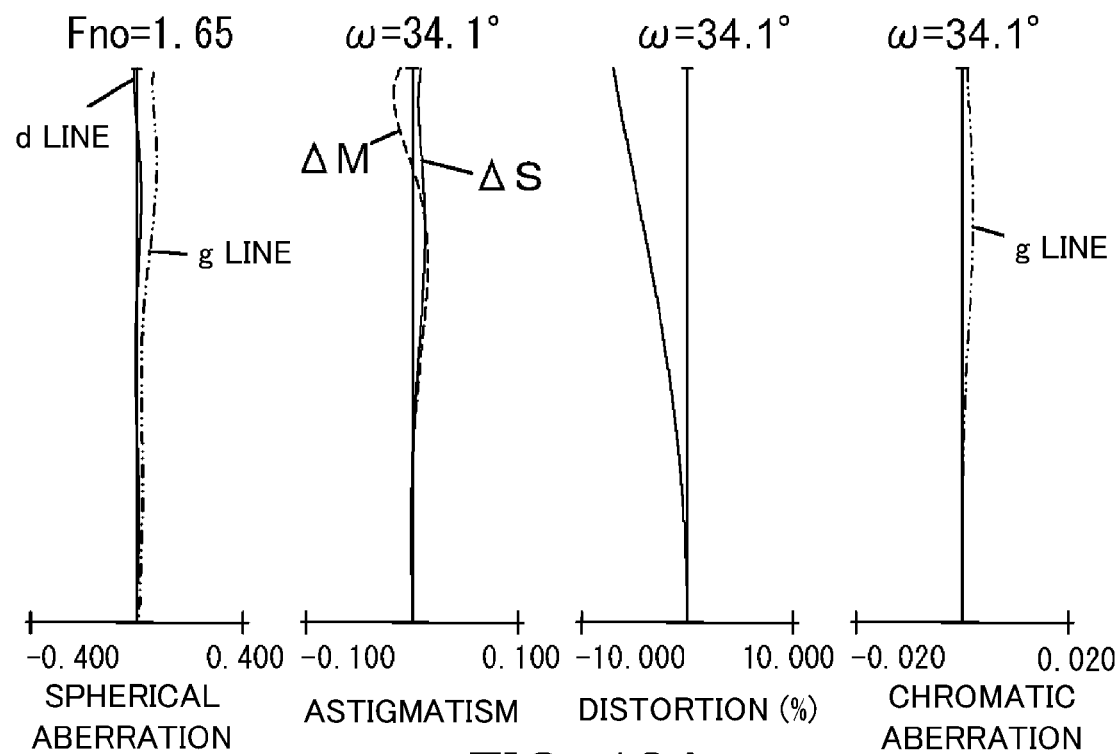
FIGS. 10A, 10B and 10C illustrate a variety of aberrations of the zoom lens on the wide angle end, an intermediate zoom position, and a telephoto end according to the fifth embodiment.
Figure 10B:
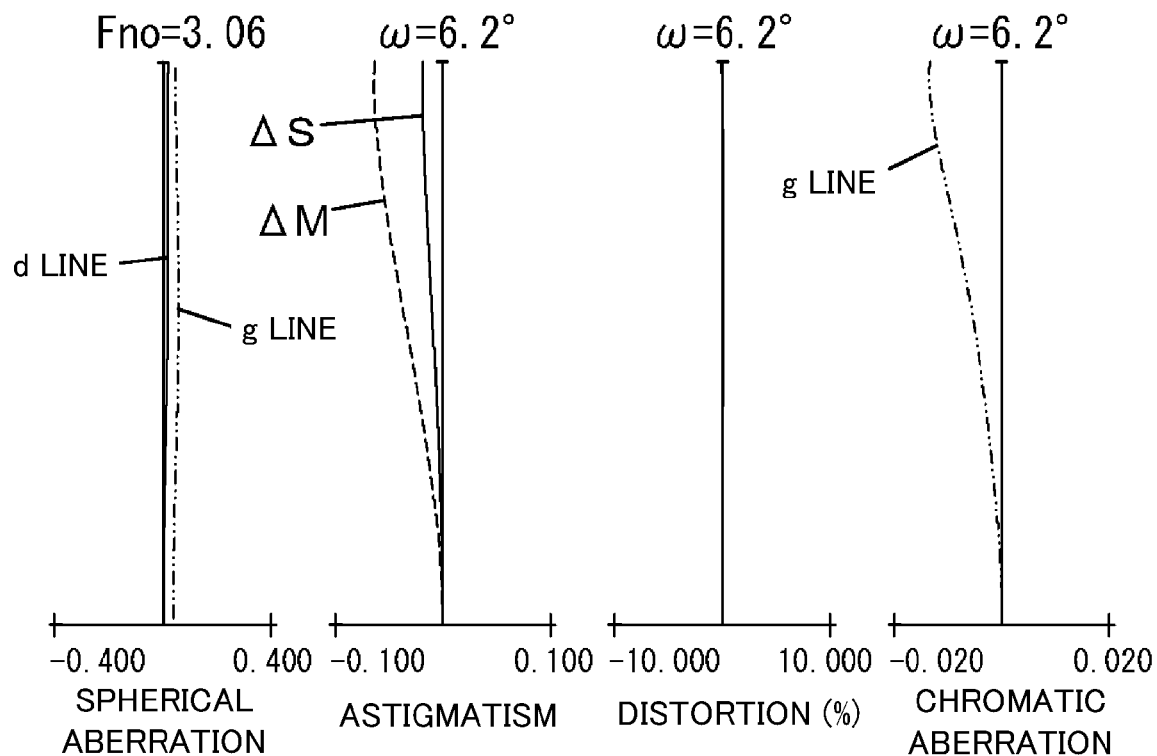
Figure 10C:
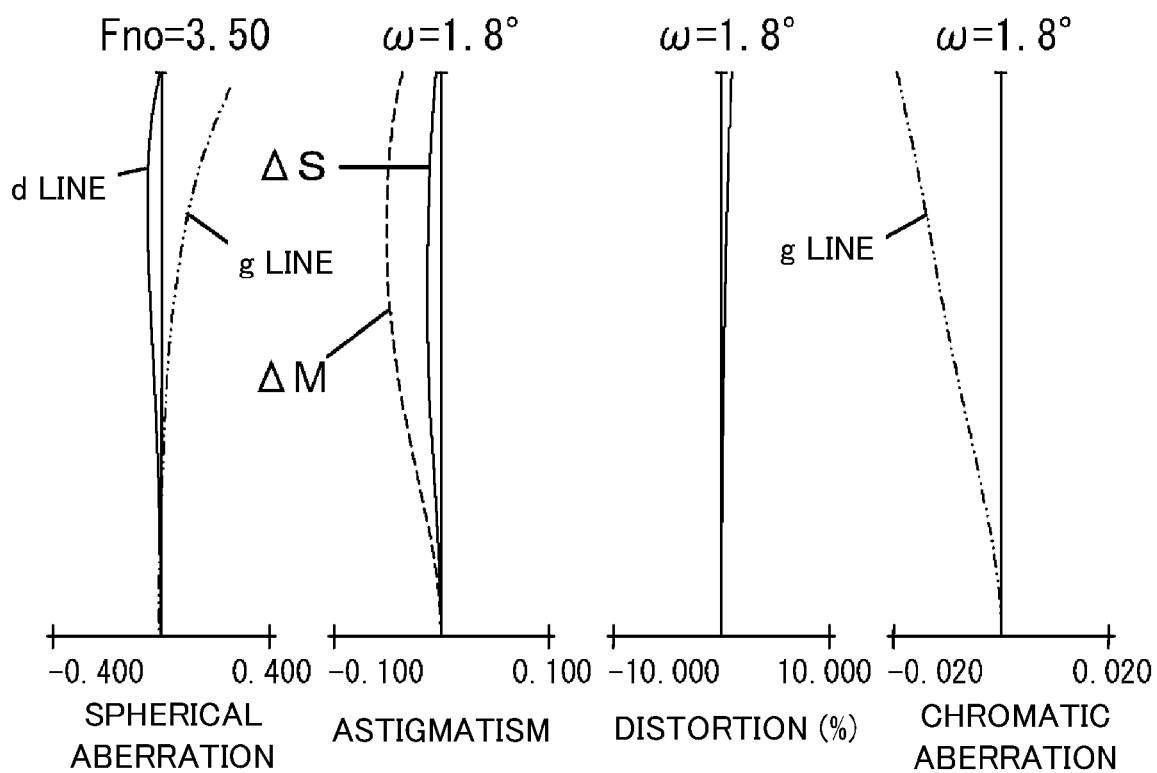
Figure 11:
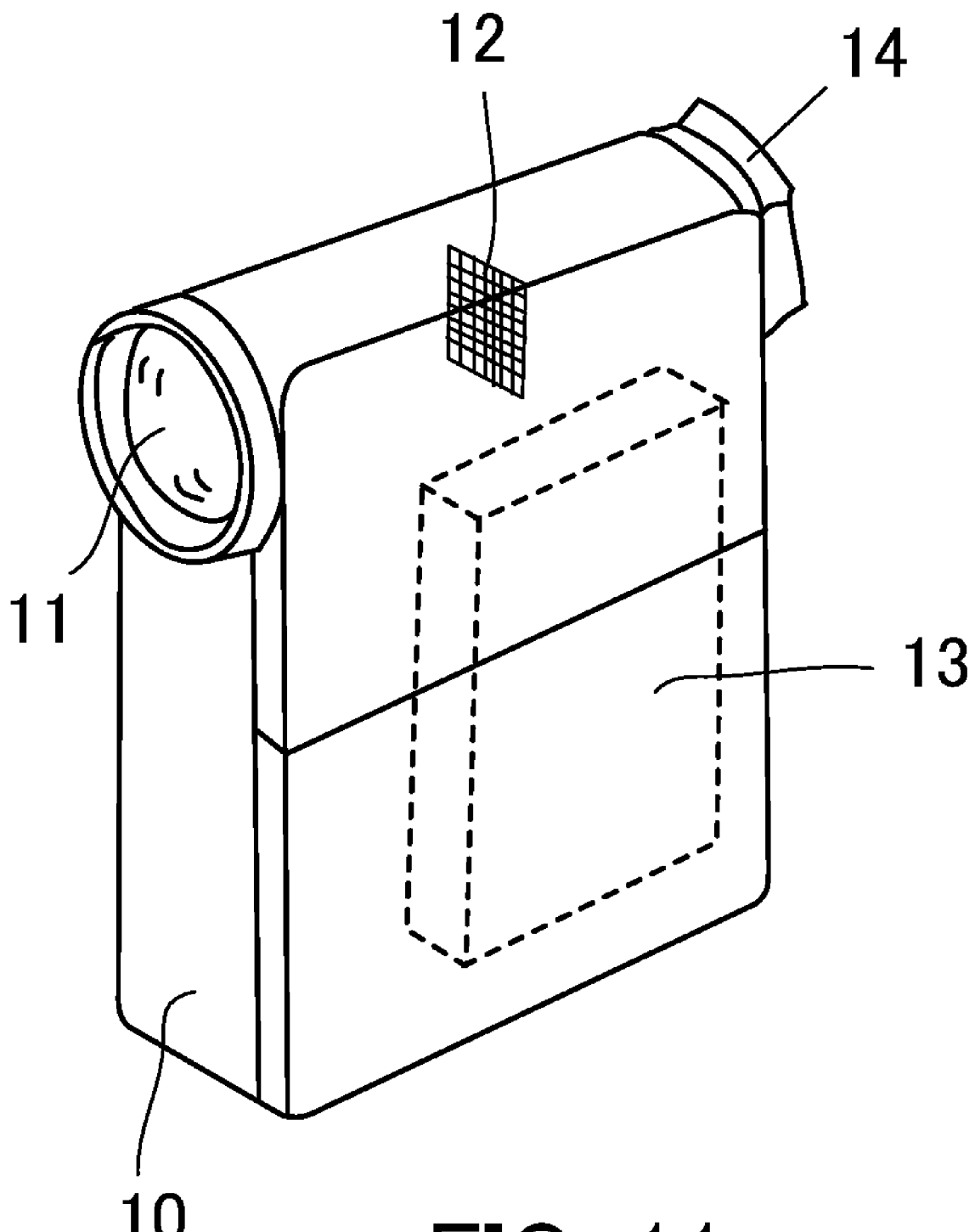
FIG. 11 is a schematic view of a principal part of a video camera that includes the zoom lens of this embodiment.

FIG. 9 is a lens sectional view on a wide angle end of a zoom lens according to a fifth embodiment of the present invention. FIGS. 10A, 10B, and 10C are aberrational diagrams of the zoom lens according to the fifth embodiment on the wide angle end, the intermediate zoom position, and the telephoto end. The zoom lens according to the fifth embodiment has a zoom ratio of 19.85, and an image pickup angle 68.2° on the wide angle end. FIG. 11 is a schematic view of a principal part of a video camera (image pickup apparatus) including the zoom lens of one of the embodiments.

The zoom lens in each embodiment is an image pickup lens system used for an image pickup apparatus, such as a video camera and a digital camera. In the lens sectional view, the left side is the object side (front side) and the right side is the image side (backside). The zoom lens in each embodiment may be used as a projection lens in a projector, etc., and the left side is a screen and the right side is a projected image in this case. In the lens sectional view, "i" denotes an order of a lens unit from the object side, and "Li" denotes an i-th lens unit.

In each of the lens sectional views of the first to fifth embodiments, L1 denotes a first lens unit having a positive refractive power (optical power equal to a reciprocal of the focal length). L2 denotes a second lens unit having a negative refractive power. L3 denotes a third lens unit having a positive refractive power. L4 denotes a fourth lens unit having a positive refractive power. In each lens unit, Gij denotes an ij-th lens that is a j-th lens in an i-th lens unit Li. In each lens sectional view of each embodiment, SP denotes an aperture stop, which is located on the object side of the third lens unit L3.

G denotes an optical block corresponding to an optical filter or a face plate. IP denotes an image plane, which corresponds to an image pickup plane of a solid-state image sensing device (photoelectric conversion element), such as a CCD sensor and a CMOS sensor in an image pickup optical system of a video camera and a digital camera, and a film surface in an image pickup optical system of a film-based camera. The spherical aberration diagram is made with the d line and the g line. ΔM and ΔS in the astigmatism diagram illustrate the meridional image plane and sagittal plane. Fno denotes an F number, and ω denotes a half angle of field. In each of the following embodiments, the wide angle end and the telephoto end are zoom positions when the magnification-varying lens unit (second lens unit L2) is located at both ends in the mechanically movable range on the optical axis.

The first to fifth embodiments disclose a four-unit zoom lens that includes, in order from the object side to the image side, a first lens unit having a positive refractive power, a second lens unit having a negative refractive power, a third lens unit having a positive refractive power, and a fourth lens unit having a positive refractive power. In zooming to a zoom position from the wide angle end to the telephoto end, the second lens unit is moved to the image side as illustrated by an arrow so as to vary a magnification. The fourth lens unit L4 is moved to the object side along a convex locus so as to correct the image-plane fluctuations associated with the magnification variations.

In addition, a rear focus type is used to provide focusing by moving the fourth lens unit L4 on the optical axis. A solid curve 4a and a dotted curve 4b of the fourth lens unit L4 are moving loci to correct the image-plane fluctuations in zooming to a zoom position from the wide angle end to the telephoto end when the fourth lens unit L4 is moved to the infinite object and the short-distance object are focused, respectively.

In each of the first to fifth embodiments, for example, focusing from the infinite object to the short-distance object at the telephoto end is performed by drawing forward the fourth lens unit L4 as illustrated by an arrow 4c. In each of the first to fifth embodiments, the first lens unit L1 and the third lens unit L3 and the aperture stop SP are immobile (fixed) in the zooming and focusing. For the aberrational correction purposes, they may be moved if necessity arises.

In each embodiment, the second lens unit L2 includes, in order from the object side to the image side, a twenty-first lens G21 having a negative refractive power, a twenty-second lens G22 having a negative refractive power, a twenty-third lens G23 having a negative refractive power, and a twenty-fourth lens G24 having a positive refractive power. Assume that fw and ft are focal lengths of an overall system at a wide angle end and at a telephoto end, f2 is a focal length of the second lens unit, TL is a distance on the optical axis from a lens surface closest to the object plane to the image plane when a distance from a lens surface closest to the image plane to the image plane is aerially converted, and D2 is a distance on the optical axis from a lens surface closest to the object plane in the second lens unit to the lens surface closest to the image plane in the second lens unit. Then, the following conditional expressions are satisfied:

$$0.01 < |f2/\sqrt{(fw*ft)}| < 0.35 \quad (1)$$

$$0.070 < D2/TL < 0.105 \quad (2)$$

In an attempt of a wider angle of view and a higher zoom ratio (higher magnification), a moving amount of a zooming lens unit and a front-lens effective diameter increase in zooming. It is important for a small front-lens effective diameter to make closer the stop position to the front lens. Hence, the zoom lens in each embodiment has a four-unit structure including a positive lens, a negative lens, a stop, a positive lens, and a positive lens in order from the object side to the image side. An interval between the first lens unit L1 and the stop SP is narrowed by restraining the overall length of the second lens unit L2.

In addition, the second lens unit L2 includes, in order from the object side to the image side, a negative lens, a negative lens, a negative lens, and a positive lens, thereby approaching the front principal point position of the second lens unit L2 to the object side. A principal point interval between the first lens unit L1 and the second lens unit L2 is made shorter than that of the real space. Thereby, the interval between the first lens unit L1 and the stop SP is made shorter, and the front-lens effective diameter is made smaller. Moreover, the each lens in the second lens unit L2 may be configured as an independent lens. Thereby, an airy lens between adjacent lenses can be used for an aberrational correction, and an aberrational fluctuation associated with zooming can be easily and properly corrected. In particular, an increase of the astigmatism can be easily restrained on the wide angle side by utilizing an airy interval between the twenty-third lens G23 and the twenty-fourth lens G24.

In order to lessen a moving amount of the second lens unit L2 and to realize a high zoom ratio in zooming, it is effective to increase the refractive power of the magnification-varying second lens unit L2. However, a too strong power would cause difficulties to restrain the fluctuations of the curvature of field in zooming.

The conditional expression (1) is a conditional expression that defines the power of the second lens unit L2. When a value is smaller than the lower limit of the conditional expression (1), the power of the second lens unit L2 becomes excessively strong and it becomes difficult to restrain the fluctuations of the curvature of field in the zooming. On the other hand, when the value is larger than the upper limit of the conditional expression (1), the power of the second lens unit L2 becomes too week, a moving amount necessary to obtain the predetermined zoom ratio becomes too large, the front-lens effective diameter becomes too large, the lens overall length becomes too long, and it becomes difficult to make small the overall system.

The conditional expression (2) is a conditional expression that defines an overall length of the second lens unit L2. When a value is larger than the upper limit of the conditional expression (2), a lens overall length becomes larger so as to secure a moving amount of the second lens unit L2 necessary for zooming. In addition, an interval between the first lens unit L1 and the stop SP becomes larger, the front-lens effective diameter becomes larger, and it becomes difficult to make small the overall system. On the other hand, when the value is smaller than the lower limit of the conditional expression (2), a central thickness of each lens becomes excessively small and it becomes difficult to stably manufacture the lens.

In each embodiment, the numerical ranges of the conditional expressions (1) and (2) may be set as follows:

$$0.100 < |f2/\sqrt{(fw*ft)}| < 0.345 \quad (1a)$$

The conditional expression (1a) further facilitates a reduction of the fluctuation of the curvature of field.

$$0.075 < D2/TL < 0.102 \quad (2a)$$

The conditional expression (2a) further facilitates a miniaturization of the overall system. More specifically, the conditional expressions (1a) and (2a) may be set as follows:

$$0.15 < |f2/\sqrt{(fw*ft)}| < 0.34 \quad (1b)$$

The conditional expression (1b) further facilitates a reduction of the fluctuation of the curvature of field.

$$0.080 < D2/TL < 0.100 \quad (2b)$$

The conditional expression (2b) further facilitates a miniaturization of the overall system.

Although the zoom lens of this embodiment is realized by satisfying the above structures, at least one of the following conditions may be satisfied so as to properly maintain an optical performance and a high zoom ratio. Assume that f1, f3, and f4 are the focal lengths of the first, third and fourth lens units. In addition, f21 is a focal length of the twenty-first lens G21, f22 is a focal length of the twenty-second lens G22, and f23 is a focal length of the twenty-third lens G23. D21 is an airy interval between the twenty-first lens G21 and the twenty-second lens G22, and D22 is an airy interval between the twenty-second lens G22 and the twenty-third lens G23. Nn2 is an average refractive index of the materials of the twenty-first lens G21, the twenty-second lens G22, and the twenty-third lens G23, and Np24 is a refractive index of the material of the twenty-fourth lens G24:

$$5.0 < |f1/f2| < 7.0 \quad (3)$$

$$3.0 < f22/f21 < 8.0 \quad (4)$$

$$1.5 < f22/f23 < 2.5 \quad (5)$$

$$0.7 < D21/D22 < 1.4 \quad (6)$$

$$0.12 < Np24 - Nn2 < 0.16 \quad (7)$$

$$Np24 > 1.9 \quad (8)$$

$$3.8 < f3/fw < 5.2 \quad (9)$$

$$2.0 < |f4/f2| < 4.0 \quad (10)$$

The conditional expression (3) is a conditional expression relating to a power allotment between the first lens unit L1 and the second lens unit L2. When a value exceeds the upper limit of the conditional equation (3), the power of the second lens unit L2 becomes stronger and a moving amount in zooming becomes shorter and is advantageous to the miniaturization. However, it becomes difficult to restrain the fluctuation of the curvature of field in zooming. On the other hand, when the value is smaller than the lower limit, the power of the first lens unit L1 becomes too strong and it becomes difficult to reduce the spherical aberration and the longitudinal chromatic aberration on the telephoto end.

The conditional expression (4) is a conditional expression relating to a power allotment between the twenty-first lens G21 having the negative refractive power and the twenty-second lens G22 having the negative refractive power in the second lens unit L2, and used to correct the fluctuations of the spherical aberration and the coma in zooming in a well-balanced manner. When a value exceeds the upper limit of the conditional equation (4), it is difficult to correct the astigmatism in the wide angle end. On the other hand, when the value is smaller than the lower limit, the front-lens effective diameter becomes too large and disadvantageous to the miniaturization of the overall system.

The conditional expression (5) is a conditional expression relating to a power allotment between the twenty-second lens G22 having the negative refractive power and twenty-third lens G23 having the negative refractive power. The aberrational fluctuation in zooming can be properly corrected by utilizing the airy lens formed between the twenty-second lens G22 and the twenty-third lens G23 to correct the aberration. When a value exceeds the upper limit of the conditional equation (5), the airy lens becomes excessively thick and it is difficult to shorten the overall length of the second lens unit L2. On the other hand, when the value is smaller than the lower limit of the conditional expression (5), the correction of the spherical aberration becomes insufficient at the telephoto end and it becomes difficult to correct the spherical aberration on the telephoto side.

The conditional expression (6) is a conditional expression relating to an allotment of an airy interval between the twenty-first lens G21 and the twenty-second lens G22 and an airy interval between the twenty-second lens G22 and the twenty-third lens G23 in the second lens unit L2. The overall length of the second lens unit L2 needs to be shorter so as to aggressively utilize the airy lens formed between the twenty-second lens G22 and the twenty-third lens G23 for the aberrational corrections and to miniaturize the entire optical system. When the value exceeds the upper limit of the conditional equation (6), the correction of the fluctuation of the spherical aberration in zooming tends to be insufficient. On the other hand, when the value is smaller than the lower limit, it becomes difficult to correct the astigmatism on the wide angle side.

The conditional expression (7) defines a difference between a refractive index of a material of a lens having a positive refractive index in the second lens unit L2 and an average value of the refractive indexes of the materials of the lenses having negative refractive indexes in the second lens unit L2. When the value exceeds the upper limit of the conditional equation (7), the refractive power of the entire second lens unit L2 lowers, a moving amount in zooming becomes larger, and the miniaturization becomes difficult. On the other hand, when the value is smaller than the lower limit of the conditional expression (7), the refractive power of the entire second lens unit L2 becomes excessive and it becomes difficult to reduce the fluctuation of the curvature of field in zooming.

The conditional expression (8) defines a refractive index of a material of the twenty-fourth lens G24 having the positive refractive power in the second lens unit L2. When the value is lower than the lower limit of the conditional equation (8), it is necessary to increase the curvature of the optical surface of the twenty-fourth lens G24, the twenty-fourth lens G24 has a thick biconvex lens, and it becomes difficult to shorten the overall length of the second lens L2.

The conditional expression (9) defines a ratio between a focal length of the third lens unit L3 and a focal length of the entire system on the wide angle end. When the value exceeds the upper limit of the conditional expression (9), the refractive powers of the first lens unit L1 and the second lens unit L2 need to be stronger. As a result, corrections of a variety of aberrations, in particular, the lateral chromatic, on the wide angle end become difficult.

The conditional expression (10) defines a power ratio between the second lens unit L2 and the fourth lens unit L4 which are configured to move in zooming. When the value exceeds the upper limit of the conditional expression (10), the back focus becomes too long and it becomes difficult to shorten the overall lens length. When the value is smaller than the lower limit of the conditional expression (10), a moving amount of the second lens unit L2 becomes too long and it becomes difficult to reduce the front-lens effective diameter and the overall lens length.

In each embodiment, the conditional expressions (3) to (10) may satisfy the following numerical ranges:

$$5.3 < |f1/f2| < 6.5 \quad (3a)$$

The conditional expression (3a) further facilitates corrections of the fluctuations of the curvature of field and the spherical aberration and the longitudinal chromatic aberration on the telephoto end in zooming.

$$3.3 < f22/f21 < 7.0 \quad (4a)$$

The conditional expression (4a) further facilitates mitigations of the fluctuations of the spherical aberration and the coma in zooming.

$$1.55 < f22/f23 < 2.4 \quad (5a)$$

The conditional expression (5a) further facilitates the corrections of the spherical aberration on the telephoto end.

$$0.8 < D21/D22 < 1.3 \quad (6a)$$

The conditional expression (6a) further facilitates the mitigations of the fluctuation of the spherical aberration and the corrections of the astigmatism on the wide angle end in zooming.

$$0.122 < Np24 - Nn2 < 0.155 \quad (7a)$$

The conditional expression (7a) further facilitates the miniaturization of the entire system.

$$Np24 > 1.92 \quad (8a)$$

The conditional expression (8a) further facilitates the miniaturization of the entire system.

$$4.0 < f3/fw < 5.1 \quad (9a)$$

The conditional expression (9a) further facilitates the corrections of the lateral chromatic aberration on the wide angle end.

$$2.5 < |f4/f2| < 3.8 \quad (10a)$$

The conditional expression (10a) further facilitates the reductions of both the back focus and the front-lens effective diameter.

In each embodiment, the conditional expressions (3a) to (10a) may satisfy the following numerical ranges:

$$5.5 < |f1/f2| < 6.0 \quad (3b)$$

The conditional expression (3b) further facilitates corrections of the fluctuation of the curvature of field and the spherical aberration and the longitudinal chromatic aberration on the telephoto end in zooming.

$$3.6 < f22/f21 < 6.0 \quad (4b)$$

The conditional expression (4b) further facilitates mitigations of the fluctuations of the spherical aberration and the coma in zooming.

$$1.6 < f22/f23 < 2.3 \quad (5b)$$

The conditional expression (5b) further facilitates the correction of the spherical aberration on the telephoto end.

$$0.9 < D21/D22 < 1.2 \quad (6b)$$

The conditional expression (6b) further facilitates the mitigation of the fluctuation of the spherical aberration and the correction of the astigmatism on the wide angle end in zooming.

$$0.125 < Np24 - Nn2 < 0.150 \quad (7b)$$

The conditional expression (7b) further facilitates the miniaturization of the entire system.

$$Np24 > 1.94 \quad (8b)$$

The conditional expression (8b) further facilitates the miniaturization of the entire system.

$$4.2 < f3/fw < 5.0 \quad (9b)$$

The conditional expression (9b) further facilitates the correction of the lateral chromatic aberration on the wide angle end.

$$2.7 < |f4/f2| < 3.6 \tag{10b}$$

The conditional expression (10b) further facilitates the reduction of both the back focus and the front-lens effective diameter.

In each embodiment, the twenty-first lens G21 in the second lens unit L2 has a meniscus shape with a concave shape on the image side. The twenty-second lens G22 has a concave shape on the image side. The twenty-third lens G23 has a biconcave shape, and the twenty-fourth lens G24 has a concave shape on the object side. This configuration can mitigate the aberrational fluctuation in zooming and facilitates the high zoom ratio when the negative refractive power of the second lens unit L2 is made larger.

Each of the above embodiments provides a zoom lens having a wide angle of view such as an image pickup angle of view of about 65° and a high zoom ratio of about 20 times, a compact entire system, and a high optical performance throughout an overall zoom range or the overall object distance.

A description will now be given of a lens structure of each embodiment. Unless otherwise specified, the lens structure will be discussed in order from the object side to the image side.

First Embodiment

The first lens unit L1 includes an eleventh lens G11 having a negative refractive power and a meniscus shape with a convex surface on the object side, a twelfth lens G12 having a positive refractive power and a convex surface on the object side, and a thirteenth lens G13 having a positive refractive power and a meniscus shape with a convex surface on the object side. The eleventh lens G11 is joined with the twelfth lens G12. Thereby, a variety of aberrations generated by the eleventh lens G11 are corrected by the twelfth lens G12 and the thirteenth lens G13.

The second lens unit L2 includes a twenty-first lens G21 having a negative refractive power and a meniscus shape with a convex surface on the object side, a twenty-second lens G22 having a negative refractive power and a meniscus shape with a convex surface on the object side, a twenty-third lens G23 having a negative refractive power and a biconcave shape, and a twenty-fourth lens G24 having a positive refractive power and a convex surface on the object side. Each lens is an independent lens.

The third lens unit L3 includes a thirty-first lens G31 having a biconvex shape and a positive refractive power, and a thirty-second lens G32 having a meniscus shape with a convex surface on the object side.

The fourth lens unit L4 is a cemented lens that includes a forty-first lens G41 having a biconvex shape and a positive refractive power, and a forty-second lens G42 having a negative refractive power, and a meniscus shape with a convex surface on the image surface side. The fourth lens L4 including the cemented lens properly corrects the longitudinal and lateral chromatic aberrations over the entire zoom range.

Second Embodiment

The lens structure of each unit is the same as that of the first embodiment.

Third Embodiment

The lens structure of each unit is the same as that of the first embodiment.

Fourth Embodiment

The lens structure of each of the first lens unit L1, the second lens unit L2, and the fourth lens unit L4 is the same as that of the first embodiment. The third lens unit L3 includes a thirty-first lens G31 having a positive refractive power, and a meniscus shape with a convex surface on the object side, a thirty-second lens G32 having a negative refractive power and a biconcave shape, and a thirty-third lens G33 having a positive refractive power and a biconvex shape.

Fifth Embodiment

The lens structure of each of the first lens unit L1 and the fourth lens unit L4 is the same as that of the first embodiment. The second lens unit L2 includes a twenty-first lens G21 having a negative refractive power and a meniscus shape with a convex surface on the object side, a twenty-second lens G22 having a negative refractive power and a meniscus shape with a convex surface on the object side, a twenty-third lens G23 having a negative refractive power and a biconcave shape, and a twenty-fourth lens G24 having a positive refractive power and a biconvex surface. The twenty-third lens G23 and the twenty-fourth lens G24 are joined with each other. The third lens unit L3 includes a thirty-first lens G31 having a positive refractive power and a meniscus shape with a convex surface on the object side, a thirty-second lens G32 having a negative refractive power and a biconcave shape, and a thirty-third lens G33 having a positive refractive power and a biconvex shape.

Each embodiment having the above lens units miniaturizes the entire lens system and obtains a high optical performance over the overall zoom range or the entire object distance with the simple lens structure. The zoom lens of each embodiment may correct the distortion among a variety of aberrations through electric image processing.

Each embodiment realizes a high-performance zoom lens through the above configuration by providing a wide angle of view such as an angle of view 2ω of about 65° on the wide angle end, and a high zoom ratio with a zoom ratio of about 20 times. In each embodiment, a lens unit having a small refractive power may be added to the object side of the first lens unit L1 or the image side of the fourth lens unit L4. A teleconverter lens or wide converter lens may be added to the object side or the image side.

Next follows numerical examples 1 to 5 corresponding to the first to fifth embodiments. In each numerical example, "i" denotes an order of the surfaces counting from the object side, "ri" denotes an i-th radius of curvature (or i-th surface), "di" denotes an interval between the i-th surface and the i+1-th surface, "ndi" and "vdi" are a refractive index and an Abbe number of a material of the i-th optical element for the d line. Two surfaces closest to the image plane in the numerical examples 1 to 5 are planes corresponding to the optical block. An aspheric shape is expressed by a displacement X in the optical-axis direction on basis of the surface vertex at the position of the height H from the optical axis. Assume that the traveling direction of the light is positive, R is a paraxial radius of curvature, k is a constant of a cone, and A3 to A12 are aspheric coefficients. At this time, the aspheric shape is expressed as follows:

$$X = \frac{H^2/R}{1+\sqrt{1-(1+k)(H/R)^2}} + A3H^3 + A4H^4 + A5H^5 + A6H^6 + A7H^7 + A8H^8 + A9H^9 + A10H^{10} + A11H^{11} + A12H^{12}$$

In each embodiment, among A3 to A12, a term having no description means 0, and * means an aspheric surface. "e-x" means $10^{-x}$. BF means a back focus. Table 1 illustrates a relationship among a variety of aberration in the above conditional expressions and numerical examples:

Numerical Example 1

Surface Data

| Sur. No. | r | d | nd | vd |
|---|---|---|---|---|
| 1 | 65.534 | 1.60 | 1.84666 | 23.9 |
| 2 | 27.639 | 6.70 | 1.69680 | 55.5 |
| 3 | ∞ | 0.17 | | |
| 4 | 26.864 | 3.40 | 1.80400 | 46.6 |
| 5 | 66.684 | (var.) | | |
| 6 | 77.463 | 0.70 | 1.88300 | 40.8 |
| 7 | 6.760 | 1.95 | | |
| 8 | 20.424 | 0.60 | 1.77250 | 49.6 |
| 9 | 12.026 | 1.84 | | |
| 10 | −22.172 | 0.60 | 1.77250 | 49.6 |
| 11 | 40.052 | 0.30 | | |
| 12 | 16.128 | 1.70 | 1.94595 | 18.0 |
| 13 | 217.453 | (var.) | | |
| 14 (stop) | ∞ | 1.20 | | |
| 15* | 10.543 | 4.50 | 1.58313 | 59.4 |
| 16* | −22.615 | 0.50 | | |
| 17 | 26.128 | 0.80 | 1.80518 | 25.4 |
| 18 | 10.802 | (var.) | | |
| 19 | 18.581 | 3.50 | 1.51823 | 58.9 |
| 20 | −8.372 | 0.60 | 1.80518 | 25.4 |
| 21 | −14.422 | (var.) | | |
| 22 | ∞ | 2.25 | 1.51633 | 64.1 |
| 23 | ∞ | (var.) | | |
| Image plane | ∞ | | | |

Aspheric Data

Fifteenth Surface

K = −9.71802e−001
A3 = −1.41237e−005
A5 = 1.68899e−006
A7 = 1.13104e−008
A9 = −3.93385e−010

Sixteenth Surface

K = −1.13015e+001
A3 = −1.30222e−006
A5 = 4.58682e−006
A7 = −4.97281e−008

Various Data
Zoom Ratio 19.79

| | Wide | Inter. | Tele. |
|---|---|---|---|
| Focal Length | 4.80 | 28.91 | 95.00 |
| Fno | 1.65 | 3.06 | 3.50 |
| Angle/Field | 33.7 | 5.9 | 1.8 |
| Image Height | 3.00 | 3.00 | 3.00 |
| Overall Lgth. | 79.88 | 79.88 | 79.88 |
| BF | 11.36 | 17.01 | 6.96 |
| d5 | 0.80 | 20.27 | 26.42 |
| d13 | 27.17 | 7.70 | 1.55 |
| d18 | 9.89 | 4.24 | 14.30 |
| d21 | 6.50 | 12.15 | 2.09 |
| d23 | 3.38 | 3.38 | 3.38 |

Zoom Lens Unit Data

| Unit | Starting Surface | Focal Length |
|---|---|---|
| 1 | 1 | 39.22 |
| 2 | 6 | −6.82 |
| 3 | 14 | 22.10 |
| 4 | 19 | 20.77 |

Numerical Example 2

Surface Data

| Sur. No. | r | d | nd | vd |
|---|---|---|---|---|
| 1 | 65.056 | 1.60 | 1.84666 | 23.9 |
| 2 | 27.426 | 6.97 | 1.69680 | 55.5 |
| 3 | 14215.813 | 0.17 | | |
| 4 | 26.685 | 3.36 | 1.80400 | 46.6 |
| 5 | 65.550 | (var.) | | |
| 6 | 67.371 | 0.60 | 1.88300 | 40.8 |
| 7 | 6.752 | 1.89 | | |
| 8 | 17.676 | 0.50 | 1.77250 | 49.6 |
| 9 | 10.227 | 1.99 | | |
| 10 | −23.921 | 0.50 | 1.80400 | 46.6 |
| 11 | 47.138 | 0.31 | | |
| 12 | 15.385 | 1.74 | 1.94595 | 18.0 |
| 13 | 155.525 | (var.) | | |
| 14 (stop) | ∞ | 1.30 | | |
| 15* | 10.789 | 4.29 | 1.58313 | 59.4 |
| 16* | −30.027 | 0.50 | | |
| 17 | 16.148 | 0.80 | 1.84666 | 23.9 |
| 18 | 9.383 | (var.) | | |
| 19 | 18.143 | 3.31 | 1.51633 | 64.1 |
| 20 | −8.905 | 0.60 | 1.84666 | 23.9 |
| 21 | −14.452 | (var.) | | |
| 22 | ∞ | 2.25 | 1.51633 | 64.1 |
| 23 | ∞ | (var.) | | |
| Image plane | ∞ | | | |

Aspheric Data

Fifteenth Surface

K = −9.06891e−001
A3 = −1.03530e−005
A5 = 3.25109e−006
A7 = −2.60610e−008
A9 = −9.36882e−010

Sixteenth Surface

K = −1.93183e+001
A3 = −7.69346e−006
A5 = 6.25992e−006
A7 = −1.26916e−007

Various Data
Zoom Ratio 19.73

| | Wide | Inter. | Tele. |
|---|---|---|---|
| Focal Length | 4.79 | 28.80 | 94.51 |
| Fno | 1.65 | 3.06 | 3.50 |
| Angle/Field | 33.7 | 6.0 | 1.8 |
| Image Height | 3.00 | 3.00 | 3.00 |
| Overall Lgth. | 79.84 | 79.84 | 79.84 |
| BF | 11.71 | 17.06 | 7.00 |

-continued

| | | | |
|---|---|---|---|
| d5 | 0.75 | 20.29 | 26.46 |
| d13 | 27.16 | 7.62 | 1.45 |
| d18 | 9.79 | 4.44 | 14.50 |
| d21 | 6.84 | 12.20 | 2.13 |
| d23 | 3.38 | 3.38 | 3.38 |

Zoom Lens Unit Data

| Unit | Starting Surface | Focal Length |
|---|---|---|
| 1 | 1 | 39.25 |
| 2 | 6 | −6.93 |
| 3 | 14 | 22.66 |
| 4 | 19 | 20.52 |

Numerical Example 3

Surface Data

| Sur. No. | r | d | nd | vd |
|---|---|---|---|---|
| 1 | 63.263 | 1.60 | 1.84666 | 23.9 |
| 2 | 27.111 | 6.29 | 1.69680 | 55.5 |
| 3 | 1525.195 | 0.17 | | |
| 4 | 26.708 | 3.23 | 1.80400 | 46.6 |
| 5 | 64.501 | (var.) | | |
| 6 | 56.421 | 0.20 | 1.88300 | 40.8 |
| 7 | 6.623 | 1.93 | | |
| 8 | 17.756 | 0.20 | 1.77250 | 49.6 |
| 9 | 10.773 | 1.91 | | |
| 10 | −24.802 | 0.20 | 1.80400 | 46.6 |
| 11 | 51.245 | 0.49 | | |
| 12 | 15.233 | 1.73 | 1.94595 | 18.0 |
| 13 | 107.928 | (var.) | | |
| 14(stop) | ∞ | 1.30 | | |
| 15* | 11.183 | 4.20 | 1.58313 | 59.4 |
| 16* | −32.677 | 0.50 | | |
| 17 | 16.253 | 0.80 | 1.84666 | 23.9 |
| 18 | 9.646 | (var.) | | |
| 19 | 19.178 | 3.25 | 1.51633 | 64.1 |
| 20 | −9.105 | 0.60 | 1.84666 | 23.9 |
| 21 | −14.556 | (var.) | | |
| 22 | ∞ | 2.25 | 1.51633 | 64.1 |
| 23 | ∞ | (var.) | | |
| Image plane | ∞ | | | |

Aspheric Data

Fifteenth Surface

K = −8.60027e−001
A3 = 2.12921e−006
A5 = 2.72892e−006
A7 = 4.57890e−009
A9 = −5.94387e−010

Sixteenth Surface

K = −2.15573e+001
A3 = 1.46828e−005
A5 = 6.62351e−006
A7 = −8.38539e−008

Various Data
Zoom Ratio 19.66

| | Wide | Inter. | Tele. |
|---|---|---|---|
| Focal Length | 4.80 | 28.88 | 94.39 |
| Fno | 1.65 | 3.06 | 3.50 |
| Angle/Field | 33.7 | 5.9 | 1.8 |
| Image Height | 3.00 | 3.00 | 3.00 |
| Overall Lgth. | 79.63 | 79.63 | 79.63 |
| BF | 12.37 | 17.53 | 7.27 |
| d5 | 0.72 | 20.81 | 27.15 |

-continued

| | | | |
|---|---|---|---|
| d13 | 28.36 | 8.27 | 1.92 |
| d18 | 9.60 | 4.43 | 14.69 |
| d21 | 7.10 | 12.26 | 2.00 |
| d23 | 3.79 | 3.79 | 3.79 |

Zoom Lens Unit Data

| Unit | Starting Surface | Focal Length |
|---|---|---|
| 1 | 1 | 39.71 |
| 2 | 6 | −7.20 |
| 3 | 14 | 23.70 |
| 4 | 19 | 20.97 |

Numerical Example 4

Surface Data

| Sur. No. | r | d | nd | vd |
|---|---|---|---|---|
| 1 | 56.792 | 1.60 | 1.84666 | 23.9 |
| 2 | 25.828 | 7.13 | 1.60311 | 60.6 |
| 3 | −899.450 | 0.20 | | |
| 4 | 25.404 | 3.62 | 1.80400 | 46.6 |
| 5 | 75.745 | (var.) | | |
| 6 | 64.274 | 0.70 | 1.88300 | 40.8 |
| 7 | 6.355 | 1.87 | | |
| 8 | 17.714 | 0.60 | 1.77250 | 49.6 |
| 9 | 11.146 | 1.70 | | |
| 10 | −25.447 | 0.60 | 1.77250 | 49.6 |
| 11 | 30.421 | 0.30 | | |
| 12 | 13.847 | 1.66 | 1.94595 | 18.0 |
| 13 | 78.491 | (var.) | | |
| 14(stop) | ∞ | 1.30 | | |
| 15* | 10.133 | 3.36 | 1.58313 | 59.4 |
| 16 | 86.836 | 2.44 | | |
| 17 | −74.636 | 0.65 | 1.84666 | 23.9 |
| 18 | 36.631 | 0.58 | | |
| 19* | 57.105 | 1.56 | 1.58313 | 59.4 |
| 20 | −42.525 | (var.) | | |
| 21 | 17.183 | 3.58 | 1.51633 | 64.1 |
| 22 | −9.574 | 0.60 | 1.84666 | 23.9 |
| 23 | −15.670 | (var.) | | |
| 24 | ∞ | 2.25 | 1.51633 | 64.1 |
| 25 | ∞ | (var.) | | |
| Image plane | ∞ | | | |

Aspheric Data

Fifteenth Surface

K = −9.50879e−001
A4 = 1.22186e−004
A6 = 1.18292e−006
A8 = −1.85370e−009
A10 = 3.29077e−010

Nineteenth Surface

K = 3.62611e+001
A4 = −3.00814e−004
A6 = −1.55891e−006
A8 = −6.72189e−008

Various Data
Zoom Ratio 19.71

| | Wide | Inter. | Tele. |
|---|---|---|---|
| Focal Length | 4.79 | 35.47 | 94.49 |
| Fno | 1.65 | 3.17 | 3.50 |
| Angle/Field | 33.5 | 4.8 | 1.8 |
| Image Height | 3.00 | 3.00 | 3.00 |
| Overall Lgth. | 79.81 | 79.81 | 79.81 |
| BF | 12.34 | 17.19 | 6.91 |

-continued

| | | | |
|---|---|---|---|
| d5 | 0.67 | 20.22 | 24.51 |
| d13 | 25.24 | 5.70 | 1.40 |
| d20 | 7.51 | 2.66 | 12.94 |
| d23 | 6.84 | 11.69 | 1.41 |
| d25 | 4.02 | 4.02 | 4.02 |

Zoom Lens Unit Data

| Unit | Starting Surface | Focal Length |
|---|---|---|
| 1 | 1 | 36.71 |
| 2 | 6 | −6.58 |
| 3 | 14 | 23.31 |
| 4 | 21 | 20.74 |

Numerical Example 5

Surface Data

| Sur. No. | r | d | nd | vd |
|---|---|---|---|---|
| 1 | 52.945 | 1.60 | 1.84666 | 23.9 |
| 2 | 26.184 | 6.74 | 1.69680 | 55.5 |
| 3 | 301.666 | 0.17 | | |
| 4 | 29.474 | 3.24 | 1.80400 | 46.6 |
| 5 | 79.520 | (var.) | | |
| 6 | 93.731 | 0.60 | 2.00069 | 25.5 |
| 7 | 7.457 | 1.86 | | |
| 8 | 24.500 | 0.80 | 1.91082 | 35.3 |
| 9 | 13.000 | 2.05 | | |
| 10 | −27.000 | 0.50 | 1.48749 | 70.2 |
| 11 | 9.922 | 2.25 | 1.94595 | 18.0 |
| 12 | 61.575 | (var.) | | |
| 13(stop) | ∞ | 1.30 | | |
| 14* | 11.189 | 3.23 | 1.58313 | 59.4 |
| 15 | 46.818 | 3.79 | | |
| 16 | −29.890 | 0.65 | 1.84666 | 23.9 |
| 17 | 132.096 | 0.20 | | |
| 18 | 37.682 | 1.73 | 1.58313 | 59.4 |
| 19* | −24.558 | (var.) | | |
| 20 | 16.048 | 4.84 | 1.48749 | 70.2 |
| 21 | −9.798 | 0.60 | 1.76182 | 26.5 |
| 22 | −18.668 | (var.) | | |
| 23 | ∞ | 2.25 | 1.51633 | 64.1 |
| 24 | ∞ | (var.) | | |
| Image plane | ∞ | | | |

Aspheric Data

Fourteenth Surface

K = −5.80665e−001
A4 = 2.34574e−005
A6 = 2.03502e−006
A8 = −7.19435e−008
A10 = 1.49915e−009
A12 = −9.47487e−012

Nineteenth Surface

K = −8.80881e−001
A4 = 1.43040e−004
A6 = 6.06800e−007
A8 = 5.63717e−008
A10 = −2.96243e−009
A12 = 4.88851e−011

Various Data
Zoom Ratio 19.85

| | Wide | Inter. | Tele. |
|---|---|---|---|
| Focal Length | 4.76 | 27.77 | 94.40 |
| Fno | 1.65 | 3.06 | 3.50 |
| Angle/Field | 34.1 | 6.2 | 1.8 |
| Image Height | 3.00 | 3.00 | 3.00 |
| Overall Lgth. | 83.88 | 83.88 | 83.88 |
| BF | 11.28 | 16.91 | 7.13 |
| d5 | 0.77 | 20.61 | 26.87 |
| d12 | 27.56 | 7.72 | 1.46 |
| d19 | 8.12 | 2.49 | 12.27 |
| d22 | 6.15 | 11.79 | 2.01 |
| d24 | 3.64 | 3.64 | 3.64 |

Zoom Lens Unit Data

| Unit | Starting Surface | Focal Length |
|---|---|---|
| 1 | 1 | 40.03 |
| 2 | 6 | −6.88 |
| 3 | 13 | 23.12 |
| 4 | 20 | 23.90 |

TABLE 1

| CONDITIONAL EXPRESSION | NUMERICAL EXAMPLE | | | | |
|---|---|---|---|---|---|
| | 1 | 2 | 3 | 4 | 5 |
| (1) $|f2/\sqrt{(fw \cdot ft)}|$ | 0.319 | 0.326 | 0.338 | 0.309 | 0.325 |
| (2) D2/TL | 0.096 | 0.093 | 0.083 | 0.092 | 0.099 |
| (3) $|f1/f2|$ | 5.750 | 5.663 | 5.511 | 5.581 | 5.817 |
| (4) f22/f21 | 4.638 | 3.790 | 4.217 | 5.045 | 3.871 |
| (5) f22/f23 | 2.124 | 1.645 | 1.729 | 2.270 | 2.122 |
| (6) D21/D22 | 1.060 | 0.951 | 1.012 | 1.096 | 0.910 |
| (7) Np24 − Nn2 | 0.137 | 0.126 | 0.126 | 0.137 | 0.146 |
| (8) Np24 | 1.94595 | 1.94595 | 1.94595 | 1.94595 | 1.94595 |
| (9) f3/fw | 4.606 | 4.731 | 4.936 | 4.863 | 4.862 |
| (10) $|f4/f2|$ | 3.046 | 2.960 | 2.911 | 3.152 | 3.473 |

Referring now to FIG. 11, a description will be given of an embodiment of a video camera that uses the zoom lens of one of the above embodiments for an image pickup optical system. In FIG. 11, reference numeral 10 denotes a video camera body, reference numeral 11 denotes an image pickup optical system including the zoom lens of one of the above embodiments. Reference numeral 12 denotes a solid-state image sensing device (photoelectric conversion element), such as a CCD sensor and a CMOS sensor, which is configured to receive light of an object image formed by the image pickup optical system 11. Reference numeral 13 denotes a memory configured to store information corresponding to the photo-electrically converted object image. Reference numeral 14 denotes a viewfinder used to observe the object image displayed by the display device (not illustrated). By applying the zoom lens of this embodiment to the image pickup apparatus, such as a video camera, the image pickup apparatus becomes small and has a high optical performance. The zoom lens of this embodiment is similarly applicable to a digital still camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-041945, filed Feb. 26, 2010 which is hereby incorporated by reference herein in its entirety.

What is claimed is:

1. A zoom lens comprising, in order from an object side to an image side, a first lens unit having a positive refractive power, a second lens unit having a negative refractive power, a third lens unit having a positive refractive power, a fourth lens unit having a positive refractive power, the first and third lens units being fixed and the second and fourth lens units being moved in zooming, wherein the second lens unit includes, in order from the object side to the image side, a sub-first lens having a negative refractive power, a sub-second lens having a negative refractive power, a sub-third lens having a negative refractive power, and a sub-fourth lens having a positive refractive power, and wherein the following conditional expressions are satisfied:

$$0.01 < |f2/\sqrt{(fw \cdot ft)}| < 0.35$$

$$0.070 < D2/TL < 0.105$$

where fw is a focal length of an overall system at a wide angle end, ft is a focal length of the overall system at a telephoto end, f2 is a focal length of the second lens unit, TL is a distance on an optical axis from a lens surface closest to an object plane to an image plane when a distance from a lens surface closest to the image plane to the image plane is aerially converted, and D2 is a distance on the optical axis from a lens surface closest to the object plane in the second lens unit to the lens surface closest to the image plane in the second lens unit.

2. The zoom lens according to claim 1, wherein the following conditional expression is satisfied:

$$5.0 < |f1/f2| < 7.0$$

where f1 is a focal length of the first lens unit.

3. The zoom lens according to claim 1, wherein the following conditional expressions are satisfied:

$$3.0 < f22/f21 < 8.0$$

$$1.5 < f22/f23 < 2.5$$

where f21 is a focal length of the sub-first lens, f22 is a focal length of the sub-second lens, and f23 is a focal length of the sub-third lens.

4. The zoom lens according to claim 1, wherein the following conditional expression is satisfied:

$$0.7 < D21/D22 < 1.4$$

where D21 is an airy interval between the sub-first lens and sub-second lens, and D22 is an airy interval between the sub-second lens and sub-third lens.

5. The zoom lens according to claim 1, wherein the following conditional expressions are satisfied:

$$0.12 < Np24 - Nn2 < 0.16$$

$$Np24 > 1.9$$

where Nn2 is an average refractive index of materials of the sub-first lens, the sub-second lens, and the sub-third lens, and Np24 is a refractive index of a material of the sub-fourth lens.

6. The zoom lens according to claim 1, wherein the following conditional expression is satisfied:

$$3.8 < f3/fw < 5.2$$

where f3 is a focal length of the third lens unit.

7. The zoom lens according to claim 1, wherein the following conditional expression is satisfied:

$$2.0 < |f4/f2| < 4.0$$

where f4 is a focal length of the fourth lens unit.

8. The zoom lens according to claim 1, wherein the sub-first lens has a meniscus shape with a concave surface on the image side, the sub-second lens has a concave shape on the image side, the sub-third lens has a biconcave shape, and the sub-fourth lens has a convex shape on the object side.

9. The zoom lens according to claim 1, further comprising an aperture stop arranged between the second lens unit and the third lens unit, and configured to be fixed in zooming.

10. An image pickup apparatus comprising a zoom lens according to claim 1, and a solid-state image sensing device configured to receive an image formed by the zoom lens.

* * * * *